(12) United States Patent
Radian

(10) Patent No.: US 11,160,048 B2
(45) Date of Patent: Oct. 26, 2021

(54) SYSTEMS AND METHODS FOR AUTOMATIC ROUTING, MAPPING, AND CLUSTERING OF REMOTE UNITS IN A DISTRIBUTED COMMUNICATION SYSTEM

(71) Applicant: Corning Research and Development Corporation, Corning, NY (US)

(72) Inventor: Eytan Radian, Hod-haSharon (IL)

(73) Assignee: Corning Research & Development Corporation, Corning, NY (US)

( * ) Notice: Subject to any disclaimer, the term of this patent is extended or adjusted under 35 U.S.C. 154(b) by 228 days.

(21) Appl. No.: 16/397,629

(22) Filed: Apr. 29, 2019

(65) Prior Publication Data
US 2020/0344715 A1 Oct. 29, 2020

(51) Int. Cl.
*H04W 64/00* (2009.01)
*H04W 8/00* (2009.01)

(52) U.S. Cl.
CPC ......... *H04W 64/006* (2013.01); *H04W 8/005* (2013.01); *H04W 64/003* (2013.01)

(58) Field of Classification Search
CPC . H04W 64/00; H04W 64/003; H04W 64/006; H04W 8/005
USPC ........................................................ 370/254
See application file for complete search history.

(56) References Cited

U.S. PATENT DOCUMENTS

| | | | |
|---|---|---|---|
| 8,548,330 B2 | 10/2013 | Berlin et al. | |
| 8,570,914 B2 | 10/2013 | Sauer | |
| 8,645,509 B2* | 2/2014 | Carriere | H04L 12/4641 709/220 |
| 8,983,301 B2 | 3/2015 | Baker et al. | |
| 9,037,143 B2 | 5/2015 | Berlin et al. | |
| 9,173,060 B2 | 10/2015 | Alles et al. | |
| 9,197,358 B2 | 11/2015 | Hejazi et al. | |
| 9,363,768 B2 | 6/2016 | Hejazi et al. | |
| 9,476,984 B2 | 10/2016 | Stapleton | |
| 9,671,496 B2 | 6/2017 | Stapleton | |
| 9,730,011 B2 | 8/2017 | Harel et al. | |
| 9,851,445 B2 | 12/2017 | Meerkerk et al. | |
| 9,958,548 B2 | 5/2018 | Stapleton et al. | |
| 10,405,344 B2 | 9/2019 | Shanmugaraju et al. | |
| 10,659,108 B2 | 5/2020 | Zhuang et al. | |
| 10,750,382 B2 | 8/2020 | Stapleton et al. | |
| 2004/0132474 A1* | 7/2004 | Wala | H04L 51/38 455/517 |
| 2015/0005005 A1 | 1/2015 | Neukirch et al. | |
| 2015/0327010 A1* | 11/2015 | Gottschalk | H04W 4/021 455/456.1 |
| 2018/0206182 A1 | 7/2018 | Bachbut et al. | |

(Continued)

FOREIGN PATENT DOCUMENTS

WO 2017/009479 A1 1/2017

*Primary Examiner* — Rownak Islam
(74) *Attorney, Agent, or Firm* — C. Keith Montgomery

(57) ABSTRACT

Automatic routing, mapping, and clustering of remote units in a distributed communication system are disclosed. A mobile device is positioned proximate a given remote unit. Measurements are made so that the distributed communication system can map the location of the remote unit to a remote unit identifier and port within a central unit of the distributed communication system. Once the remote units are mapped to specific locations and the ports properly identified, the central unit may designate clusters within the distributed communication system.

16 Claims, 16 Drawing Sheets

(56) References Cited

U.S. PATENT DOCUMENTS

2018/0212692 A1    7/2018  Kummetz et al.
2018/0234937 A1*   8/2018  Yoon .................... G01S 11/06

\* cited by examiner

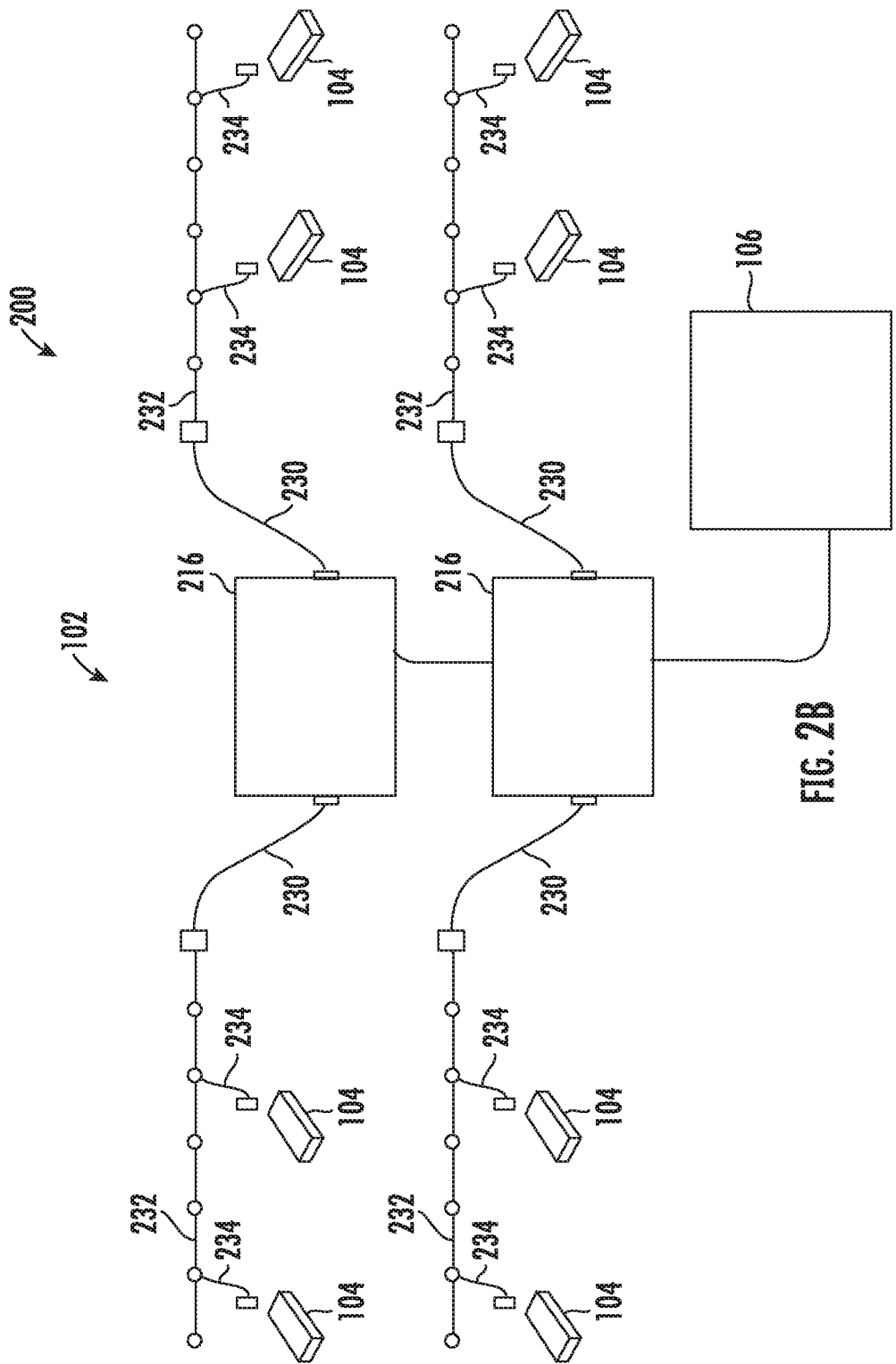

TABLE-700A

| RU ID | RU PORT |
|---|---|
| 90BH5 | 3 |
| ⋮ | ⋮ |
| 8A4C2 | 18 |

TABLE-700B

| CELL | PORT |
|---|---|
| 1 | 2 |
| 2 | 1 |

TABLE-700C

| RU ID | RU PORT | RU LOCATION |
|---|---|---|
| 90BH5 | 3 | FLOOR 2, W |
| ⋮ | ⋮ | ⋮ |
| 8A4C2 | 18 | FRONT DESK |

TABLE-700D

| RU ID | RU PORT | RU LOCATION | CELLS | CLUSTER |
|---|---|---|---|---|
| 90BH5 | 3 | FLOOR 2, W | 1, 2 | 3 |
| ⋮ | ⋮ | ⋮ | ⋮ | ⋮ |
| 8A4C2 | 18 | FRONT DESK | 2 | 3, 4 |

FIG. 7

SYSTEMS AND METHODS FOR AUTOMATIC ROUTING, MAPPING, AND CLUSTERING OF REMOTE UNITS IN A DISTRIBUTED COMMUNICATION SYSTEM

BACKGROUND

The technology of the disclosure relates to facilitating the installation and initial operation of remote units in a distributed communication system.

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). In such areas, distributed communication or distributed antenna systems communicate with wireless devices called "clients," which must reside within the wireless range or "cell coverage area" to communicate with an access point device.

One approach to deploying a distributed antenna system involves the use of radio frequency (RF) antenna coverage areas, also referred to as "antenna coverage areas." Antenna coverage areas can have a radius in the range from a few meters up to twenty meters as an example. Combining a number of access point devices creates an array of antenna coverage areas. Because the antenna coverage areas each cover small areas, there are typically only a few users (clients) per antenna coverage area. This allows for minimizing the amount of RF bandwidth shared among the wireless system users. It may be desirable to provide antenna coverage areas in a building or other facility to provide distributed antenna system access to clients within the building or facility. However, it may be desirable to employ optical fiber to distribute communication signals. Benefits of optical fiber include increased bandwidth.

One type of distributed antenna system for creating antenna coverage areas includes distribution of RF communication signals over an electrical conductor medium, such as coaxial cable or twisted pair wiring. Another type of distributed antenna system for creating antenna coverage areas, called "Radio-over-Fiber," or "RoF," utilizes RF communication signals sent over optical fibers. Both types of systems can include head-end equipment coupled to a plurality of remote units (RUs), which may include an antenna and may be referred to as a remote antenna unit or RAU. Each RU provides antenna coverage areas. The RUs can each include RF transceivers coupled to an antenna to transmit RF communication signals wirelessly, wherein the RUs are coupled to the head-end equipment via the communication medium. The RF transceivers in the RUs are transparent to the RF communication signals. The antennas in the RUs also receive RF signals (i.e., electromagnetic radiation) from clients in the antenna coverage area. The RF signals are then sent over the communication medium to the head-end equipment. In optical fiber or RoF distributed antenna systems, the RUs convert incoming optical RF signals from an optical fiber downlink to electrical RF signals via optical-to-electrical (O-E) converters, which are then passed to the RF transceiver. The RUs also convert received electrical RF communication signals from clients via the antennas to optical RF communication signals via electrical-to-optical (E-O) converters. The optical RF signals are then sent over an optical fiber uplink to the head-end equipment.

While some RUs are simple antennas that merely bring an existing cellular-type service into an area with poor reception (e.g., inside large buildings), other RUs may be more robust and may actually act as a fully functional cell (e.g., a picocell, femtocell, microcell, or the like) with registration, hand-off, and other traditional cellular functions. Still other RUs may act as some form of hybrid with some, but not all, functions of a traditional cell, but more functionality than a simple antenna.

While the advent and expansion of such distributed communication systems has allowed high traffic areas (e.g., airport terminals, sports arenas, malls, high-rise office buildings, and the like) that otherwise would saturate a given cell of a cellular network to still have cellular service, the density with which the RUs may sometimes be deployed creates its own challenges. Specifically, the RUs must first be physically installed, such as through mounting them above ceiling tiles, or the like, and then fiber must be physically coupled from a head-end unit to each RU. In small buildings, the number of RUs may be relatively small with a correspondingly small number of fibers, but in large, high traffic areas, the number of fibers may exceed one hundred fibers. Each fiber is then manually connected to a port in the head-end unit. In a perfect world, the technician who does this installation perfectly matches each fiber to its intended port, such that it is known what port connects to what RU and where that RU is within the system. However, errors may occur, and the system may not know to what RU a particular fiber is connected, or where a particular coverage area is within the system. Such uncertainty may make certain location-based services (e.g., E911) challenging or even possibly completely unavailable. Accordingly, the mistakes must then be found and corrected, usually through a painstaking manual process. Thus, there is room for improvement in how such systems are installed.

No admission is made that any reference cited herein constitutes prior art. Applicant expressly reserves the right to challenge the accuracy and pertinency of any cited documents.

SUMMARY

Embodiments disclosed in the detailed description improve automatic routing, mapping, and clustering of remote units in a distributed communication system. Related components, systems, and methods are also disclosed. In embodiments disclosed herein, a mobile device is positioned proximate a given remote unit. Measurements are made so that the distributed communication system can map the location of the remote unit to a remote unit identifier and port within a central unit of the distributed communication system. Once the remote units are mapped to specific locations and the ports properly identified, the central unit may designate clusters within the distributed communication system. This process allows installation to be free of a requirement for the initial connections between the central unit and remote units to be known.

In one exemplary aspect of the disclosure, a method of mapping locations of remote units in a distributed communication system is disclosed. The method comprises detecting an application mobile unit with at least one of a plurality of remote units in the distributed communication system. The method also comprises determining which of the plurality of remote units is closest to the application mobile unit. The method also comprises receiving at a central unit a location identifier from the application mobile unit. The method also comprises mapping the location identifier to a respective output port in the central unit.

An additional embodiment of the disclosure relates to a central unit in a distributed communication system. The central unit comprises a plurality of cell input ports. The central unit also comprises a plurality of remote unit output ports. The central unit also comprises a control system operatively coupled to the plurality of cell input ports and the plurality of remote unit output ports. The control system is configured to detect an application mobile unit with at least one of a plurality of remote units in the distributed communication system. The control system is also configured to determine which of the plurality of remote units is closest to the application mobile unit. The control system is also configured to receive a location identifier from the application mobile unit. The control system is also configured to map the location identifier to a respective output port in a central unit.

An additional embodiment of the disclosure relates to a distributed communication system. The distributed communication system comprises a plurality of remote units. The distributed communication system also includes a central unit coupled each of the plurality of remote units through respective fiber-based communication media. The central unit comprises a plurality of cell input ports. The central unit also comprises a plurality of remote unit output ports configured to be coupled to the fiber-based communication media. The central unit also comprises a control system operatively coupled to the plurality of cell input ports and the plurality of remote unit output ports. The control system is configured to detect an application mobile unit with at least one of the plurality remote units in the distributed communication system. The control system is also configured to determine which of the plurality of remote units is closest to the application mobile unit. The control system is also configured to receive a location identifier from the application mobile unit. The control system is also configured to map the location identifier to a respective output port in the central unit.

Additional features and advantages will be set forth in the detailed description which follows, and in part will be readily apparent to those skilled in the art from the description or recognized by practicing the embodiments as described in the written description and the claims hereof, as well as the appended drawings.

It is to be understood that both the foregoing general description and the following detailed description are merely embodiments, and are intended to provide an overview or framework to understand the nature and character of the claims.

The accompanying drawings are included to provide a further understanding, and are incorporated in and constitute a part of this specification. The drawings illustrate one or more embodiment(s), and together with the description, serve to explain principles and operation of the various embodiments.

BRIEF DESCRIPTION OF THE DRAWINGS

FIG. 2B is an alternative diagram of the distributed communication system in FIG. 2A;

FIG. 7 illustrates simplified tables used to store mapping information as the mapping processes of the present disclosure are implemented;

DETAILED DESCRIPTION

Embodiments disclosed in the detailed description improve automatic routing, mapping, and clustering of remote units in a distributed communication system. Related components, systems, and methods are also disclosed. In embodiments disclosed herein, a mobile device is positioned proximate a given remote unit. Measurements are made so that the distributed communication system can map the location of the remote unit to a remote unit identifier and port within a central unit of the distributed communication system. Once the remote units are mapped to specific locations and the ports properly identified, the central unit may designate clusters within the distributed communication system. This process allows installation to be free of a requirement for the initial connections between the central unit and remote units to be known.

Figure 1:
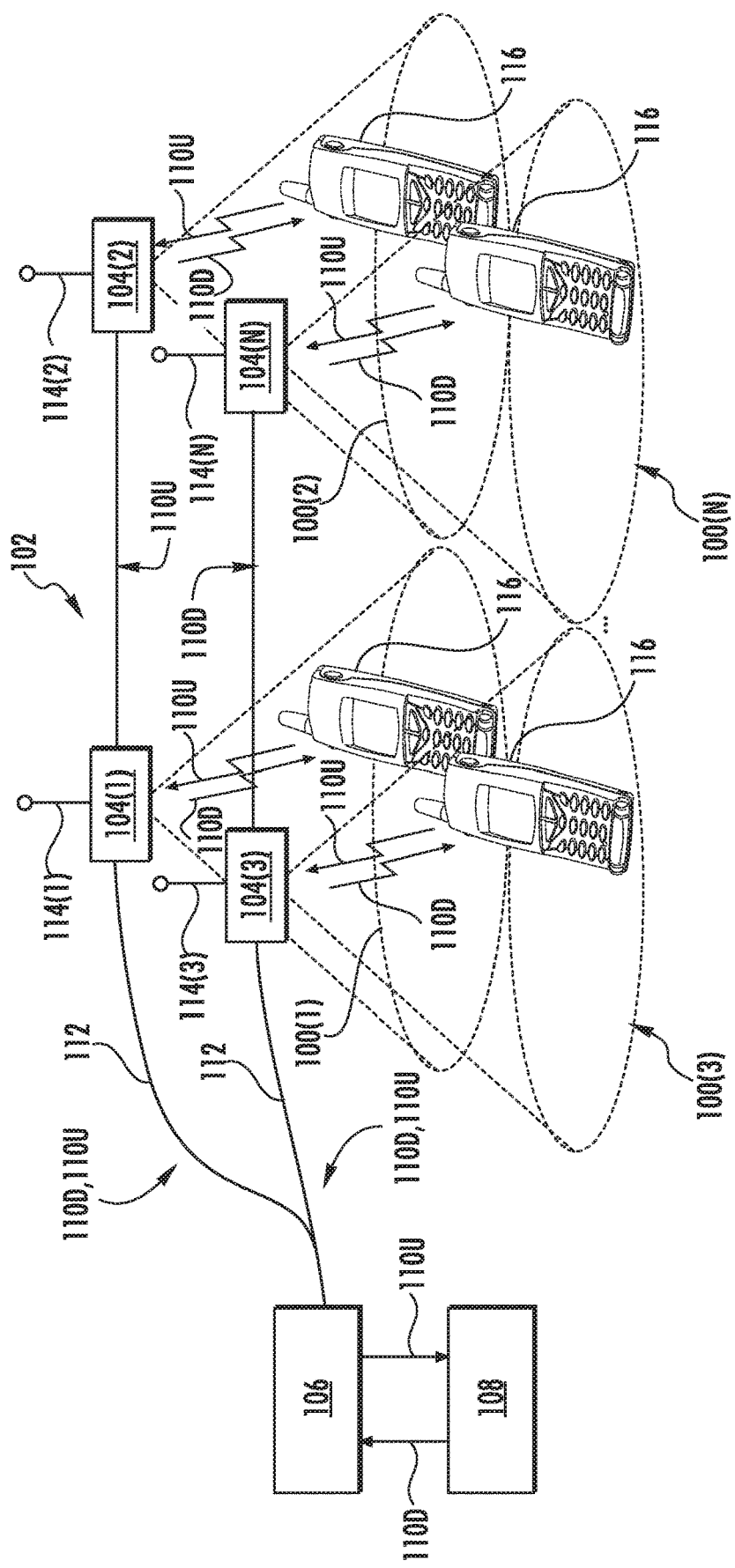
FIG. 1 is a schematic diagram of an exemplary distributed communication system that may have been installed and then routed, mapped, and clustered according to techniques of the present disclosure.
Figure 2A:
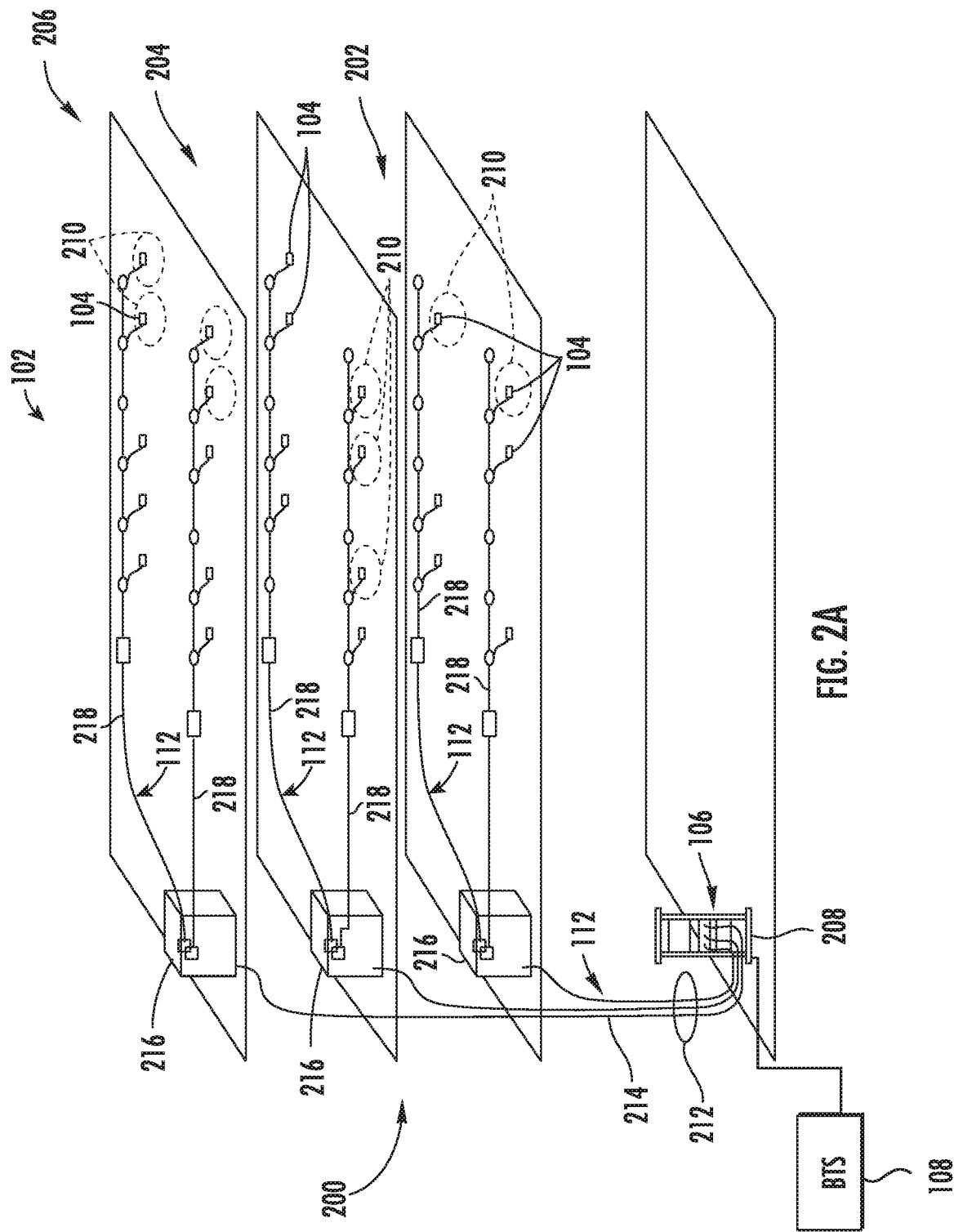
FIG. 2A is a partial schematic cut-away diagram of an exemplary building infrastructure in which the distributed communication system in FIG. 1 can be employed.
Figure 3:
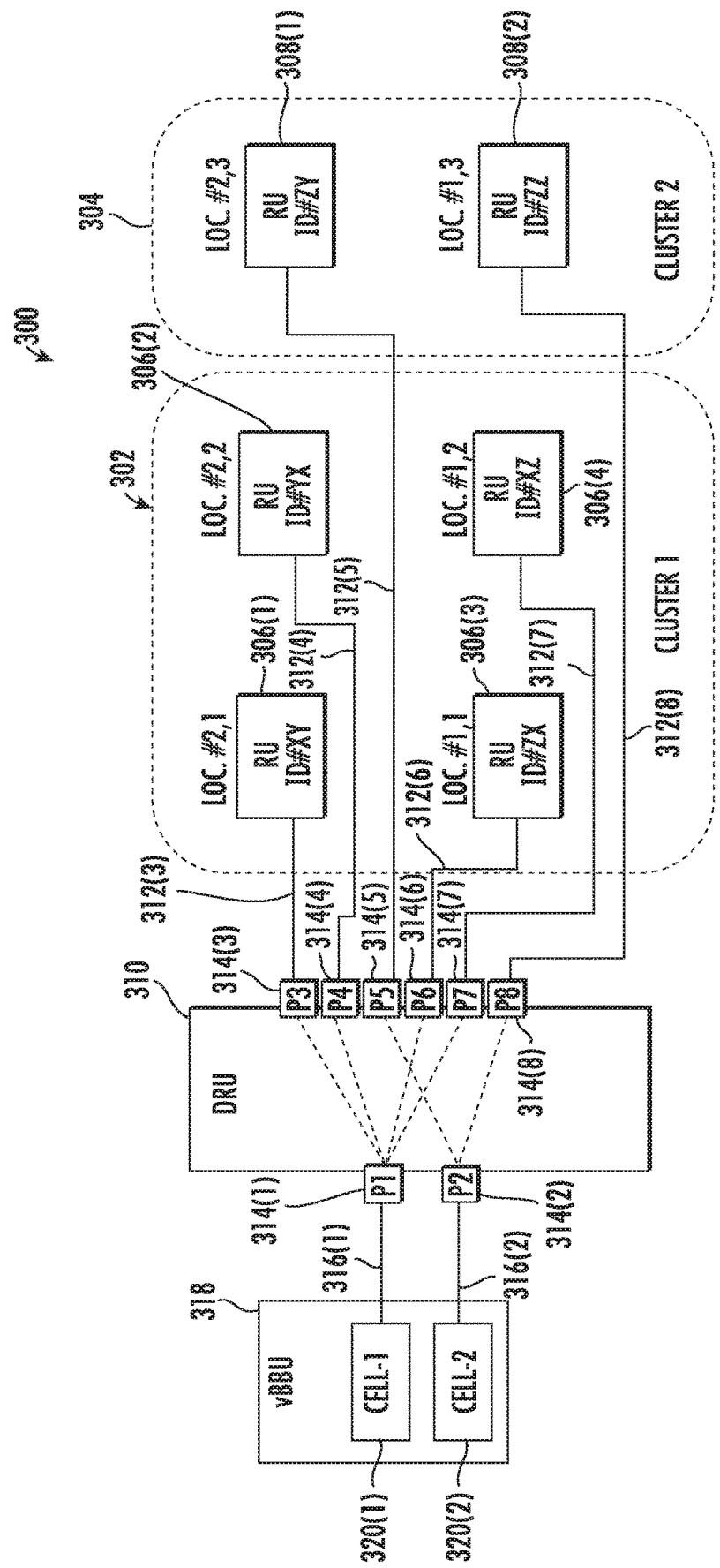
FIG. 3 is a schematic diagram of clusters within a distributed communication system such as the system of FIG. 1.

The concepts of the present disclosure are applicable to different types of distributed communication systems, and before discussing exemplary automatic routing, mapping, and clustering of remote units techniques, a discussion of an exemplary distributed communication system capable of distributing radio frequency (RF) communication signals to distributed or remote units (RUs) is first described with regard to FIGS. 1-3. A discussion of exemplary aspects of the present disclosure begins below with reference to FIG. 4.

As a point of nomenclature, it should be appreciated that in an exemplary embodiment, the RUs may contain antennas such that the RU is a remote antenna unit and may sometimes be referred to as a RAU.

In this regard, FIG. 1 illustrates distribution of communication services to remote coverage areas 100(1)-100(N) of a wireless distribution system (WDS, also referred to herein as a distributed communication system, a distributed antenna system (DAS), a centralized radio access network (cRAN, note that in some literature cRAN is used to refer to a cloud radio access network—the terms and usages are effectively interchangeable herein), or wireless communication system (WCS)) 102, wherein 'N' is the number of remote coverage areas. These communication services can include cellular services, wireless services, such as RF identification (RFID) tracking, Wireless Fidelity (WiFi), local area network (LAN), and wireless LAN (WLAN), wireless solutions (Bluetooth, WiFi Global Positioning System (GPS) signal-based, and others) for location-based services, and combinations thereof, as examples. The remote coverage areas 100(1)-100(N) (sometimes referred to as cellular cells) are created by, and centered on, remote units 104(1)-104(N) (sometimes these may be low power remote units (LPR), but are more commonly referred to herein as just a remote unit (RU) or remote antenna unit (RAU)) connected to a central unit 106 (e.g., a digital routing unit (DRU) a head-end controller, a head-end unit (HEU), or the like). The central unit 106 may be communicatively coupled to a signal source 108, for example, a base transceiver station (BTS) or a baseband unit (BBU). The communicative coupling may be wireless (e.g., such as through a cellular network) or over a wire-based/fiber-based system (e.g., such as through some form of telephony network backbone or the Internet). When the signal source 108 is a BBU, the signal source 108 may communicate with the central unit 106, which may be a DRU, using digital communication protocols such as the common public radio interface (CPRI). In this regard, the central unit 106 receives downlink communication signals 110D from the signal source 108 to be distributed to the remote units 104(1)-104(N). The remote units 104(1)-104(N) are configured to receive the downlink communication signals 110D from the central unit 106 over a communication medium 112 to be distributed to the respective remote coverage areas 100(1)-100(N) of the remote units 104(1)-104(N). In a non-limiting example, the communication medium 112 may be a wired communication medium, a wireless communication medium, or an optical fiber-based communication medium. While wireless is possible, exemplary aspects of the present disclosure are well-suited for situations where the medium is a physical conductor (electrical, optical, or some other waveguide (e.g., a wireless microwave system may still use a microwave waveguide)). Each of the remote units 104(1)-104(N) may include an RF transmitter/receiver (not shown) and a respective antenna 114(1)-114(N) operably connected to the RF transmitter/receiver to distribute wirelessly the communication services to client devices 116 within the respective remote coverage areas 100(1)-100(N). The remote units 104(1)-104(N) are also configured to receive uplink communication signals 110U from the client devices 116 in the respective remote coverage areas 100(1)-100(N) to be distributed to the signal source 108. The size of each of the remote coverage areas 100(1)-100(N) is determined by an amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

With reference to FIG. 1, the central unit 106 may include electronic processing devices (i.e., a control system), for example a field-programmable gate array (FPGA), a digital signal processor (DSP), and/or a central processing unit (CPU), for processing the downlink communication signals 110D and the uplink communication signals 110 as well as handling other operations for the mapping and routing described herein. Likewise, each of the remote units 104(1)-104(N) also employs electronic processing devices for processing the downlink communication signals 110D and the uplink communication signals 110U. Further, the communication medium 112 is only able to carry the downlink communication signals 110D and the uplink communication signals 110U up to a maximum bandwidth. Collectively, the processing capabilities of the electronic processing devices in the central unit 106, the processing capabilities of the electronic processing devices in the remote units 104(1)-104(N), and the maximum bandwidth of the communication medium 112 provide the system resources available in the WDS 102.

To provide further exemplary illustration of how a distributed antenna system can be deployed indoors, FIG. 2A is provided. FIG. 2A is a partial schematic cut-away diagram of a building infrastructure 200 employing an optical fiber-based distributed communication system. The system may be the WDS 102 of FIG. 1. The building infrastructure 200 generally represents any type of building in which the WDS 102 can be deployed (e.g., an office building, a sports arena or sports stadium, an airport, hotel, convention center, or the like). As previously discussed with regard to FIG. 1, the WDS 102 incorporates the central unit 106 to provide various types of communication services to coverage areas within the building infrastructure 200, as an example.

For example, as discussed in more detail below, the WDS 102 in this embodiment is configured to receive wireless RF signals and convert the RF signals into RoF signals to be communicated over the communication medium 112 to multiple RUs 104. The WDS 102 in this embodiment can be, for example, an indoor distributed antenna system (IDAS), a small cell system, or a hybrid system such as a cRAN to provide wireless service inside the building infrastructure 200. These wireless signals can include cellular service, wireless services such as RFID tracking, WiFi, LAN, WLAN, public safety, wireless building automations, and combinations thereof, as examples.

With continuing reference to FIG. 2A, the building infrastructure 200 in this embodiment includes a first (ground) floor 202, a second floor 204, and a third floor 206. The floors 202, 204, 206 are serviced by the central unit 106 through a main distribution frame 208 to provide antenna coverage areas 210 in the building infrastructure 200. Only the ceilings of the floors 202, 204, 206 are shown in FIG. 2A for simplicity of illustration. In the example embodiment, a main cable 212 has a number of different sections that facilitate the placement of a large number of RUs 104 in the building infrastructure 200. Each RU 104 in turn services its own coverage area in the antenna coverage areas 210. The main cable 212 can include, for example, a riser cable 214 that carries all of the downlink and uplink optical fibers to and from the central unit 106. The riser cable 214 may be routed through a power unit or other intermediate unit 216 on each floor of the building. The power unit or other intermediate unit 216 may also be configured to provide power to the RUs 104 via an electrical power line provided inside an array cable 218, or tail cable or home-run tether cable as other examples, and distributed with the downlink and uplink optical fibers to the RUs 104. For example, as illustrated in the building infrastructure 200 in FIG. 2B, a tail cable 230 may extend from the power units 216 into an array cable 232. Downlink and uplink optical fibers in tether cables 234 of the array cables 232 are routed to each of the RUs 104, as illustrated in FIG. 2B. Referring back to FIG. 2A, the main cable 212 can include one or more multi-cable (MC) connectors adapted to connect select downlink and uplink optical fibers along with an electrical power line, to a number of optical fiber cables.

With continued reference to FIG. 2A, the main cable 212 enables multiple optical fiber cables to be distributed throughout the building infrastructure 200 (e.g., fixed to the ceilings or other support surfaces of each floor 202, 204, 206) to provide the antenna coverage areas 210 for the first, second, and third floors 202, 204, and 206. In an example embodiment, the central unit 106 is located within the building infrastructure 200 (e.g., in a closet or control room), while in another example embodiment, the central unit 106 may be located outside of the building infrastructure 200 at a remote location. A base transceiver station (BTS) or BBU (not shown) may act as a signal source 108, which may be provided by a second party such as a cellular service provider, is connected to the central unit 106, and can be co-located or located remotely from the central unit 106.

In a typical cellular system, for example, a plurality of BTSs or BBUs is deployed at a plurality of remote locations to provide wireless telephone coverage. Each BTS serves a corresponding cell and when a mobile client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater, picocell, or femtocell as other examples.

The WDS 102 in FIGS. 1-2B described above provides point-to-point communication between the central unit 106 and the RU 104. A multi-point architecture is possible as well. With regard to FIGS. 1-2B, each RU 104 may communicate with the central unit 106 over a distinct downlink and uplink optical fiber pair to provide the point-to-point communication. Whenever an RU 104 is installed in the WDS 102, the RU 104 is connected to a distinct downlink and uplink optical fiber pair connected to the central unit 106. The downlink and uplink optical fibers may be provided in a fiber optic cable. Multiple downlink and uplink optical fiber pairs can be provided in a fiber optic cable to service multiple RUs 104 from a common fiber optic cable. It is this requirement for precise connections that helps give rise to the present disclosure.

The central unit 106 may be configured to support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

In practice, some distributed communication systems will provide multiple RUs to a single general location. Such situation may be referred to as clustering. For example, the west wing of a concourse in a sports arena may be a single cluster serving all the mobile clients in the west wing. Such clustering becomes more relevant when providing location-based services such as E911 services. The cluster, and more specifically the cluster location, is provided with the cell identifier associated with the cluster to the emergency services database to assist in routing emergency responders to an appropriate location. An exemplary system 300 is illustrated in FIG. 3 with two clusters 302 and 304 corresponding to two distinct locations (e.g., the west wing and the east wing respectively). The cluster 302 includes four RUs 306(1)-306(4), and the cluster 304 includes two RUs 308(1)-308(2). Each of the RUs 306(1)-306(4) and 308(1)-308(2) is connected to a DRU 310 (which may be the central unit 106 described above) by respective optical fibers 312(3)-312(8). In particular, the optical fibers 312(3)-312(8) are plugged into respective ports 314(3)-314(8) of the DRU 310. Ports 314(1) and 314(2) of the DRU 310 are connected to communication media 316(1)-316(2) that carry signals from a virtual baseband unit (vBBU) 318 (which may the signal source 108 described above). The communication media 316(1)-316(2) correspond to respective cells 320(1)-320(2) within the vBBU 318. Each RU 306(1)-306(4) has an associated RU identifier (denoted ID #) and is positioned at a specific location (denoted Loc. #). During installation, the technician places an RU at each location designated on the building schematics/blueprints. These designated locations correspond herein to the Loc. #. The technician may (or may not) know the RU identifier of an RU as the technician installs the RU. The technician also couples the optical fibers 312(3)-312(8) to the RUs 306(1)-306(4) and 308(1)-308(2) and to the ports 314(3)-314(8) of the DRU 310. Relevant to the present discussion is that, for location-based services, there must be some entity that knows (e.g., through a look-up table stored in memory or the like) the relationships between a given RU ID, given location, and port of the DRU 310. This process is outlined in the flowchart of FIG. 4.

Figure 4:
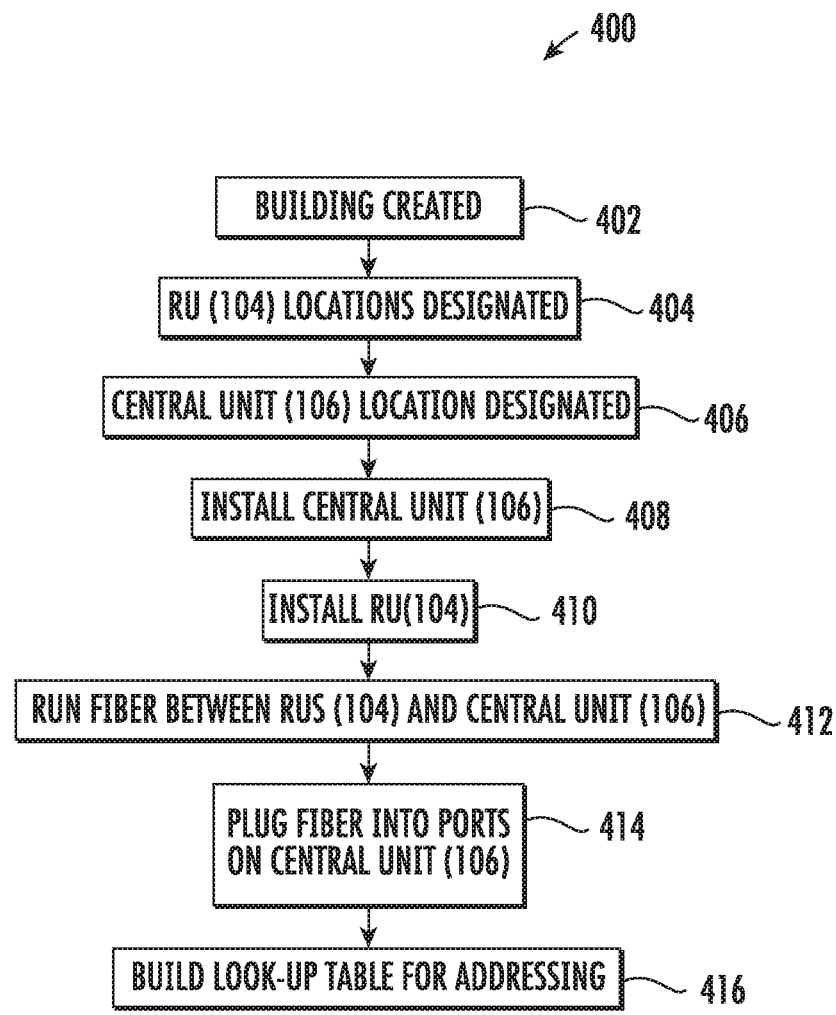
FIG. 4 is a flowchart illustrating a general process for installing, routing, and mapping a new distributed communication system.

In this regard, FIG. 4 illustrates process 400 for installing a distributed communication system such as the WDS 102 of FIG. 1 or the system 300 of FIG. 3. The process 400 begins with the building (e.g., building 200) or location being created (block 402). The RU (306, 308) locations are designated (block 404). Further, the central unit 106 location is designated (block 406). Note that the locations could be designated during the planning stages of the building, as the building is being created, or after completion of the building as desired. A technician may then install the central unit 106 (block 408) and the RUs 104 (block 410). Note that the order in which the central unit 106 and the RUs 104 are installed may vary and is not central to the present disclosure. Typically, after blocks 408 and 410, the technician may run fiber between the RUs 104 and the central unit 106 (block 412). Note that there may be some overlap in that fiber may be run while RUs 104 are still being installed (e.g., once one floor has its RUs 104 installed, fiber may be run on that floor before all RUs 104 are installed on a different floor). Note that for large locales, the number of fibers may exceed one hundred or even five hundred fibers. If the fibers are single mode fibers or unidirectional fibers, then there may be uplink and downlink fibers for each RU, effectively doubling the number of fibers present. The technician then plugs the individual fibers into ports on the central unit 106 (block 414). In conventional systems, the technician would need to track which fibers came from which RU locations and plug the fiber into a specific port. Exemplary aspects of the present disclosure obviate this need and allow the technician to just make connections. After the connections are made, a look-up table is built for addressing the RUs 104 relative to locations and clusters (block 416).

Exemplary aspects of the present disclosure provide a variety of ways to automate the creation of the table from block 416. Further, the creation of the table does not require precision on the part of the technician when connecting fibers to the central unit 106. Rather, exemplary aspects of the present disclosure provide techniques to map RU location and RU identifiers to the table after installation. Once the mapping is performed, location-based services such as E911 may be operational.

Figure 5A:
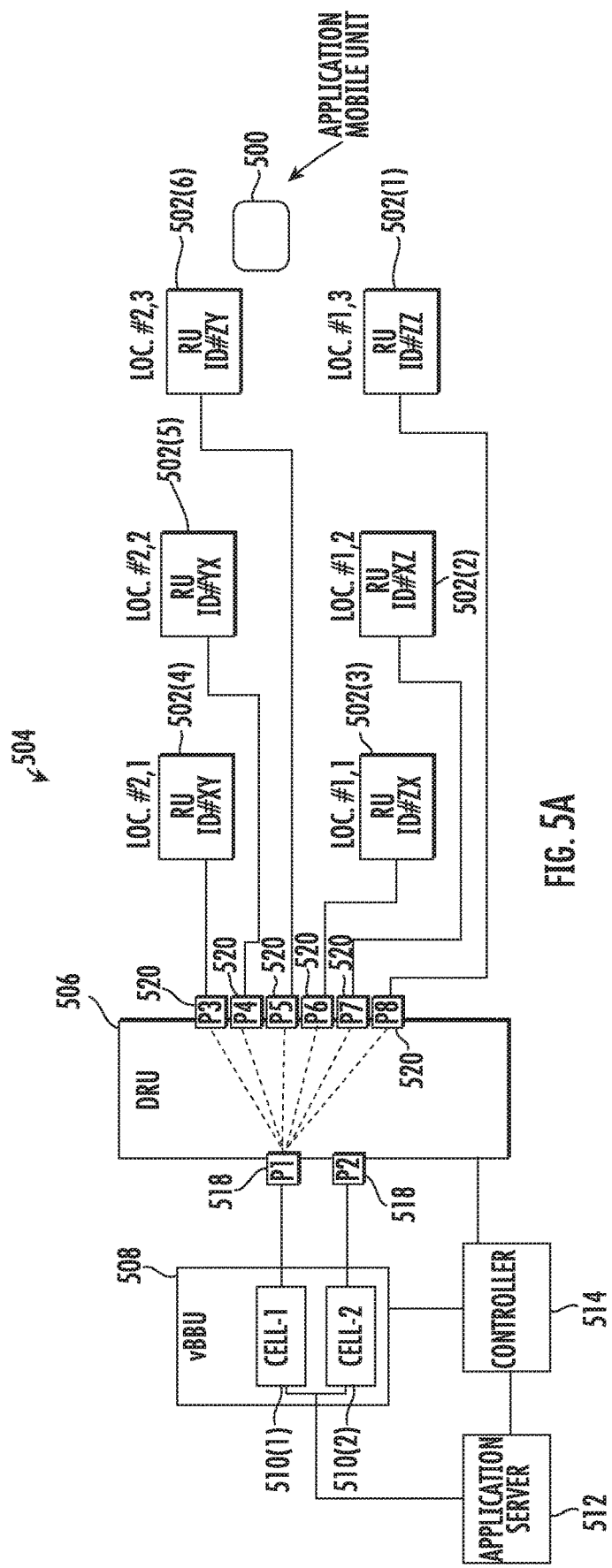
FIG. 5A is a schematic diagram showing a distributed communication system mapping remote units through a first exemplary technique.
Figure 5B:
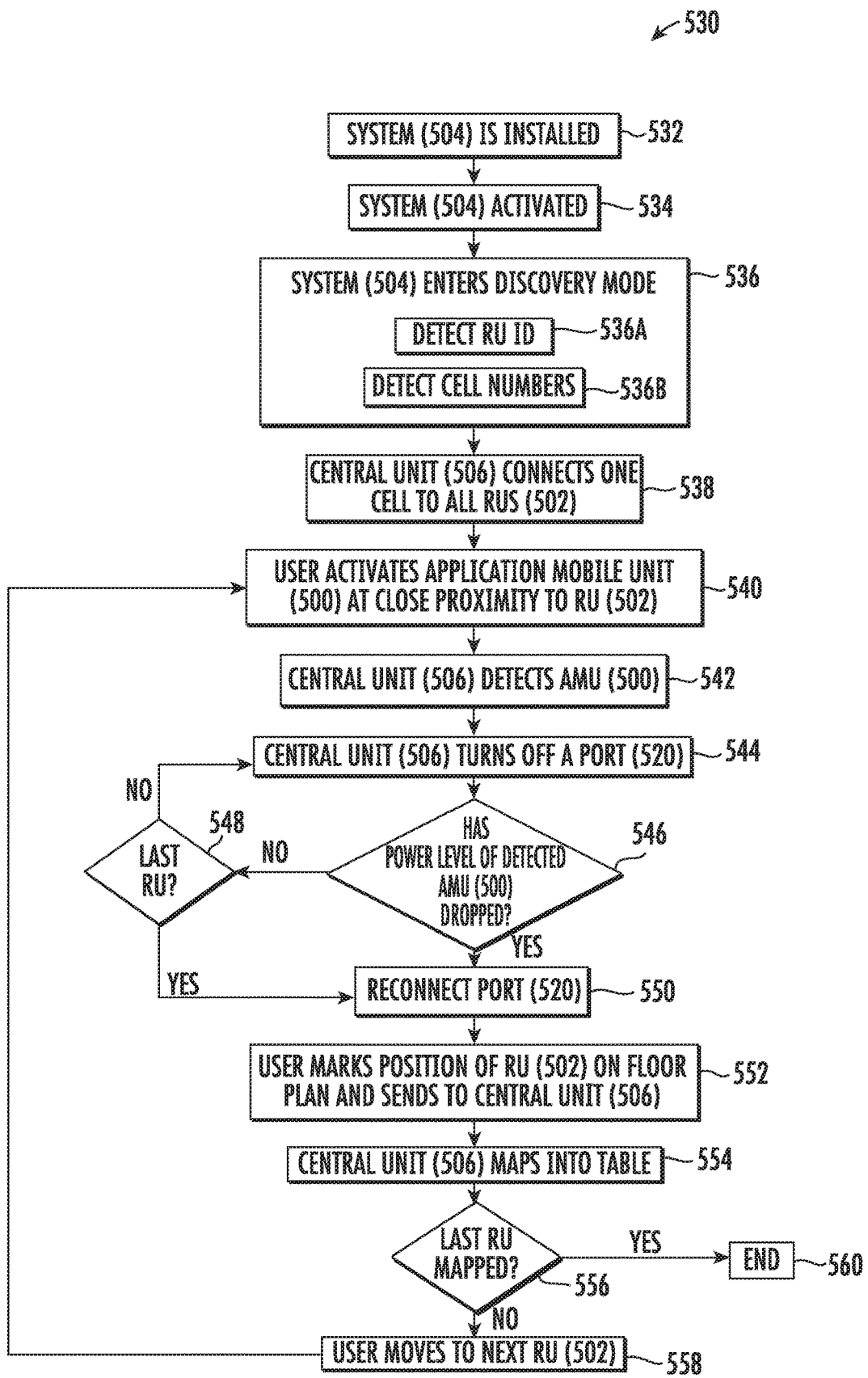
FIG. 5B is a flowchart explaining the first technique of FIG. 5A.

In this regard, FIGS. 5A and 5B illustrate a first exemplary mapping technique. In particular, the technique uses an application mobile unit (AMU) 500 together with RUs 502(1)-502(6) of a distributed communication system 504 to allow a central unit 506 to route, cluster, and map the connections. The AMU 500 may be a smart phone with a display, a laptop computer, a tablet, or the like and may have software that supports some functions as outlined below. As illustrated, the central unit 506 is a DRU that is coupled to a vBBU 508 having two cells 510(1) and 510(2). Additionally, an application server 512 and a controller 514 operate with the vBBU 508. The application server 512 may reside within a cloud, within the vBBU 508, or other location as needed or desired. The application server 512 may exchange messages with the AMU 500 through the central unit 506 and different ones of the RUs 502(1)-502(6). The controller 514 receives commands from the application server 512 and configures the central unit 506 and the vBBU 508. Optionally, the controller 514 may configure the RUs 502(1)-502 (6). The controller 514 may be implemented as part of the vBBU 508, the application server 512, or the central unit 506. It is also possible that the controller 514 may be distributed with different functions in different physical elements.

The process for clustering, routing, and mapping the distributed communication system 504 is set forth as process 530 with reference to FIG. 5B. The process 530 begins when the distributed communication system 504 is installed in a location (block 532). The distributed communication system 504 is activated (block 534) such as through providing power to the appropriate elements. The distributed communication system 504 then enters discovery mode (block 536) such as through detecting the RU ID of each RU 502 coupled to the central unit 506 (block 536A) and detecting cell numbers (block 536B). The cells 510 of the vBBU 508 have cell identifiers and are readily available to the central unit 506 through respective input ports 518. The central unit 506 then connects one cell (e.g., cell 510(1) in FIG. 5A) to all the RUs 502 (block 538, symbolically illustrated by the dotted lines extending from the port 518 of cell 510(1) to all the output ports 520 associated with the RUs 502).

With continued reference to FIG. 5B, the process 530 continues where a user (e.g., a technician or the like) may activate the AMU 500 at close proximity to a given RU 502 (e.g., 502(6)) (block 540). The central unit 506 detects the AMU 500 through the RUs 502 (block 542), but may not know precisely which RU 502(1)-502(6) is closest to the AMU 500. Accordingly, the central unit 506 turns off a port 520 (block 544) and determines if there is a substantial drop in received power from the AMU 500 (block 546). If the answer to block 546 is no, then the central unit 506 determines if there is only a last RU still on (block 548). If the answer to block 548 is no, then the process 530 iterates through back to block 544 to turn off a next port 520. If the answer to block 546 is yes, then the central unit 506 reconnects the just disconnected port 520 (block 550). If the answer to block 548 is yes or the process 530 has moved through block 550, then the user marks the position of the RU 502 on the floor plan on the AMU 500 and sends this information (i.e., a location identifier) to the central unit 506 (block 552). That is, the user may have a floor schematic that appears on the display of the AMU 500 and the floor schematic may mark where the RUs 502(1)-502(6) are located. The user stands proximate one of the RUs 502 and designates the location through the AMU 500 as the central unit 506 sequentially disconnects each port 520 to test which port 520 has the associated RU 502. As used herein, stands proximate means within about two meters of the RU 502. This location is provided to the central unit 506 which maps this location to the RU 502 by the RU identifier and port 520 that has the highest detected power level from the AMU 500. This mapping may then be stored in a table (block 554) such as tables 700A-700D explained below with reference to FIG. 7. After mapping into the table at block 554, the central unit 506 determines if the last RU 502 has been mapped (block 556). If the answer is no, then the user moves to the next RU 502 (block 558) and the process 530 iterates again from block 540. If the answer to block 556 is yes, then the process 530 ends (block 560).

Figure 6:
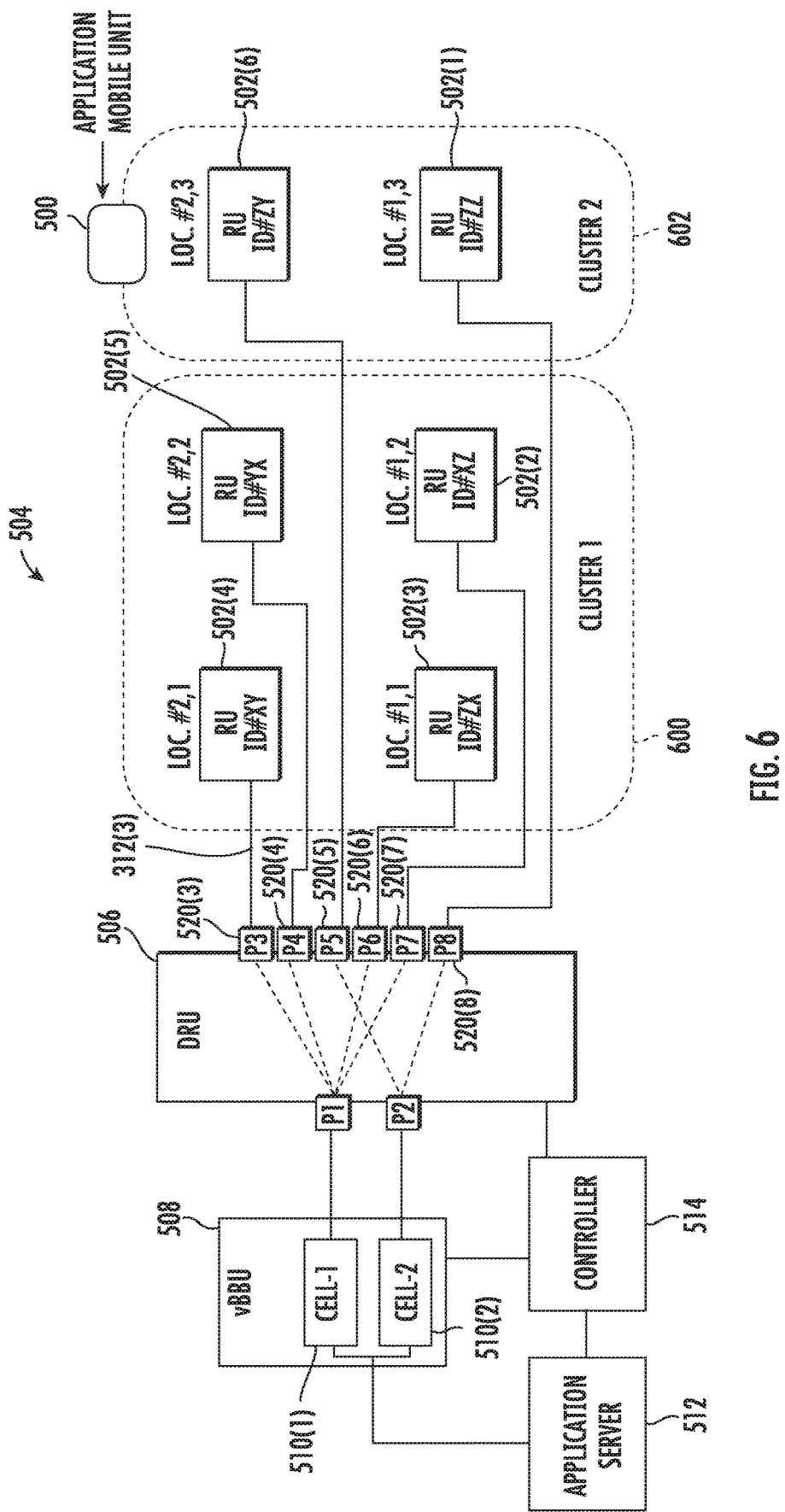
FIG. 6 is a schematic diagram of the distributed communication system of FIG. 5A after mapping and clustering.

Based on the information provided during the testing of the process 530, the central unit 506 may map and cluster the RUs 502 to cells 510 according to a predetermined plan as better illustrated in FIG. 6. For example, after the process 530, the central unit 506 knows that RU 502(1) has RU identifier zz and is in location 1,3; RU 502(2) has RU identifier xz and is in location 1,2; RU 502(3) has RU identifier zx and is in location 1,1; RU 502(4) has RU identifier xy and is in location 2,1; RU 502(5) has RU identifier yx and is in location 2,2; and RU 502(6) has RU identifier zy and is in location 2,3. Further, the central unit 506 knows that locations 2,1; 2,2; 1,1; and 1,2 are associated with a first cluster 600, and that locations 2,3 and 1,3 are associated with a second cluster 602. By design, the first cluster 600 is served by the first cell 510(1) and has the cell identifier of the first cell 510(1) for location-based services. Likewise, the second cluster 602 is served by the second cell 510(2) and has the cell identifier of the second cell 510(2) for location-based services. Still further, by virtue of the mapping, the central unit 506 knows which ports 520(3)-520(8) correspond to which RUs 502(1)-502(6) and can route signals from the cells 510(1)-510(2) to the appropriate ports 520(3)-520(8).

The table referred to above may be populated as explained with reference to FIG. 7. After block 536, the central unit 506 has received the RU identifiers and cell numbers. The RU identifiers were received through specific ports, so the central unit 506 may populate table 700A with entries for a RU ID column 702 and a RU port column 704. Likewise, cell numbers and cell ports may be known and are filled in table 700B in a cell number column 706 and a cell port column 708, respectively. As the user and the AMU 500 map RUs 502 to locations (e.g., through the process 530), a RU location column 710 may be populated with location identifiers as shown in table 700C. After the RU locations are populated, the central unit 506 may assign RUs 502 to specific clusters and/or cells as noted by columns 712 and 714 in table 700D.

Figure 8:
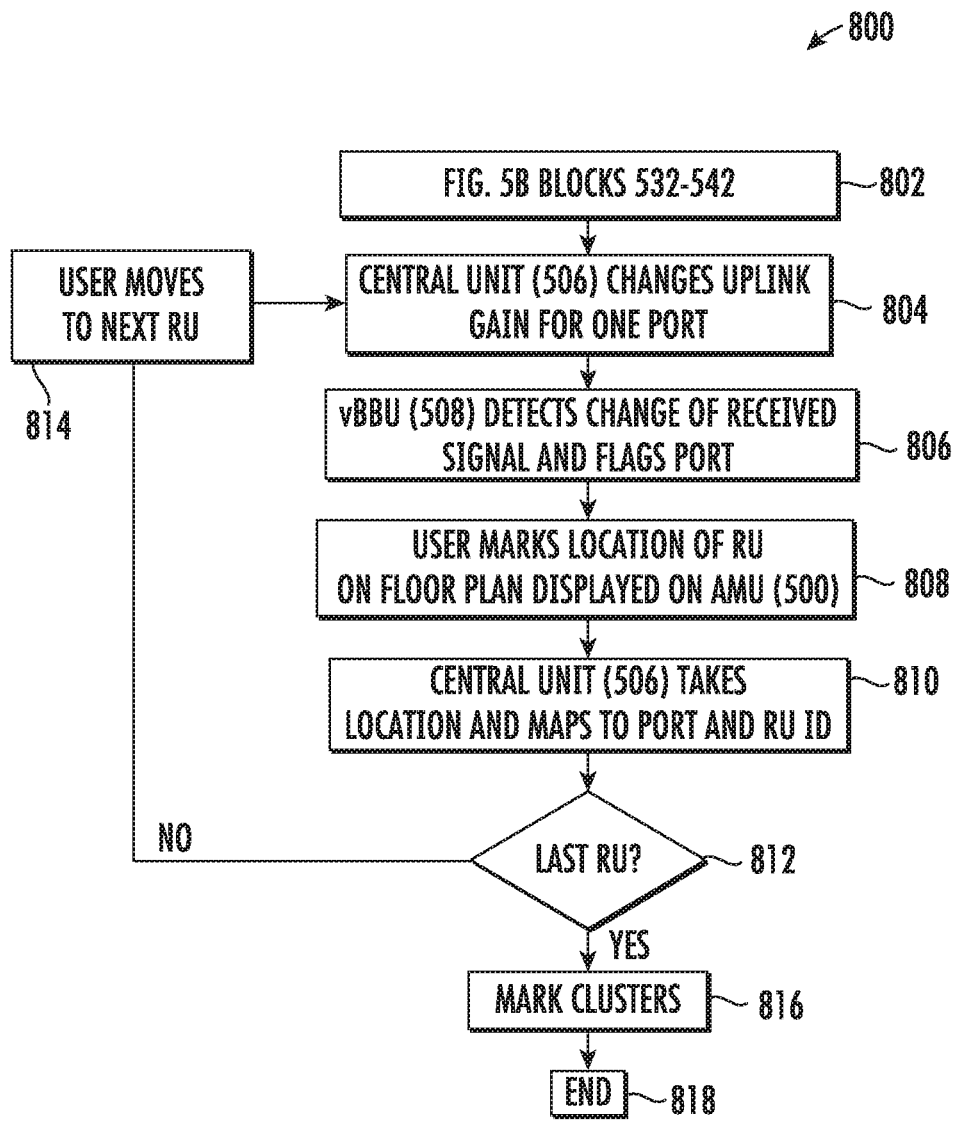
FIG. 8 is a flowchart of a second technique for routing and mapping according to the present disclosure.

While the process 530 is one technique through which the mapping and clustering may be performed, there are other comparable processes. Two such alternate processes are explored in FIGS. 8 and 9. The process 800 illustrated in FIG. 8 begins much like the process 530 of FIG. 5B starting at block 532 and extending to block 542 (generally noted at block 802), where the process 800 diverges. The central unit 506 changes an uplink gain for one port (block 804) causing one RU to change its uplink gain. The vBBU 508 detects a change at a received signal and flags the associated port (block 806). The user marks the location of the RU on the floor plan displayed on the AMU 500 (block 808). The central unit 506 takes the location and maps to the respective port and RU identifier (block 810). The central unit 506 determines if this was the last RU to be tested (block 812). If the answer to block 812 is no, then the user moves to the next RU (block 814) and the process 800 repeats at block 804. If the answer is yes, then the central unit 506 marks clusters (block 816) and the process 800 ends (block 818).

Figure 9:
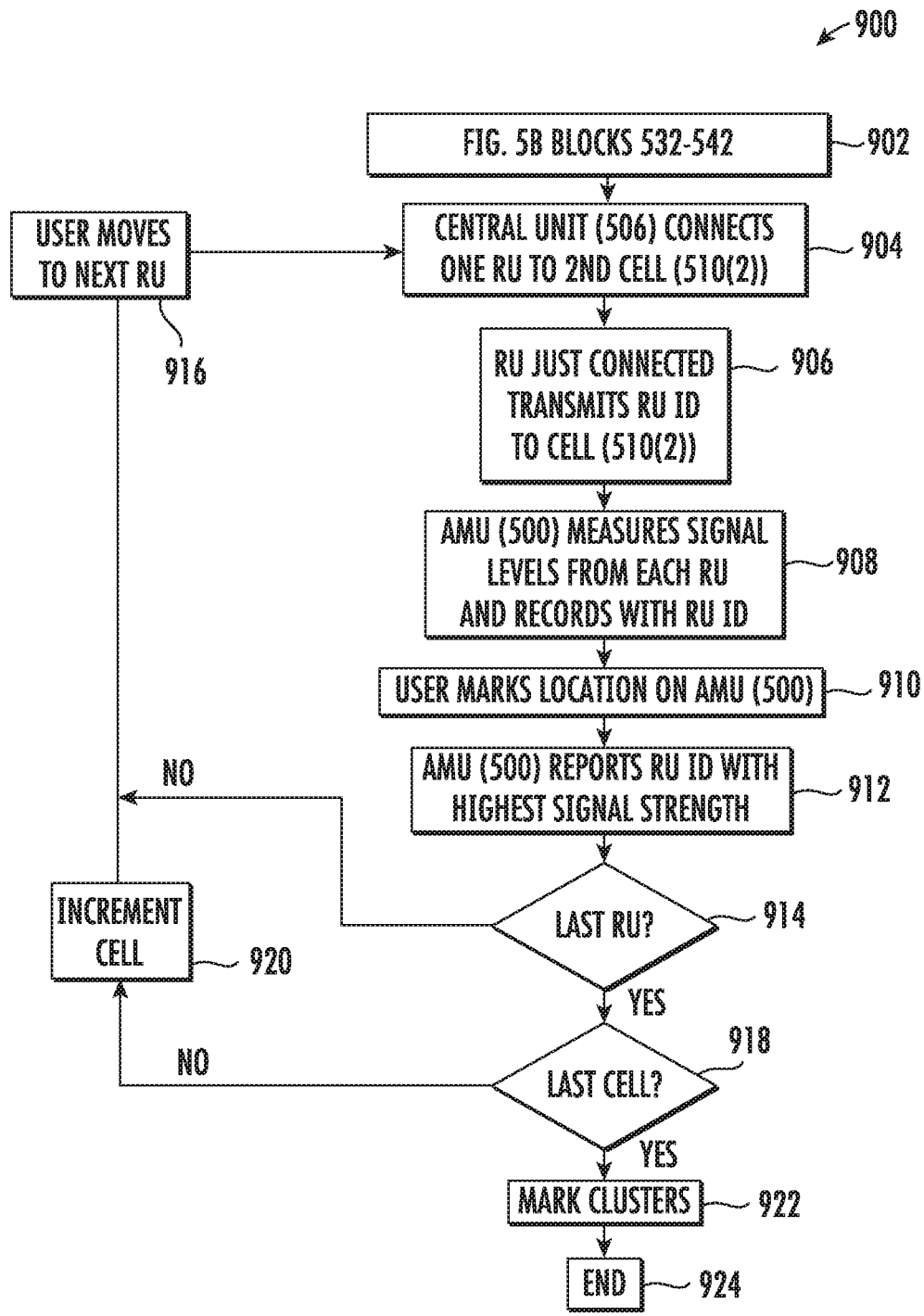
FIG. 9 is a flowchart of a third technique for routing and mapping according to the present disclosure.

The process 900, illustrated in FIG. 9, likewise begins identically to the process 530 of FIG. 5B starting at block 532 and extending to block 542 (generally noted at block 902), where the process 900 diverges. The central unit 506 connects one RU to a second cell (e.g., cell 510(2)) (block 904). The RU just so connected transmits its RU identifier to the cell 510(2) (block 906). The AMU 500 measures the signal levels from each RU and records with an associated RU identifier received from the respective RUs (block 908). The user may then mark the location of the RU on the display of the AMU 500 (block 910), and the AMU 500 reports the RU identifier with the highest signal strength (block 912) to the central unit 506. The central unit 506 determines if that was the last RU (block 914). If the answer is no, the user moves to the next RU (block 916) and the process 900 repeats as noted. If the answer to block 914 is yes, then the central unit 506 may determine if all cells have been tested (block 918). If the answer to block 918 is no, then the process 900 may increment the cell (block 920), and repeat the process 900 as noted. If the answer to block 918 is yes, then the central unit 506 may make the clusters (block 922) and the process 900 ends (block 924).

Figure 10:
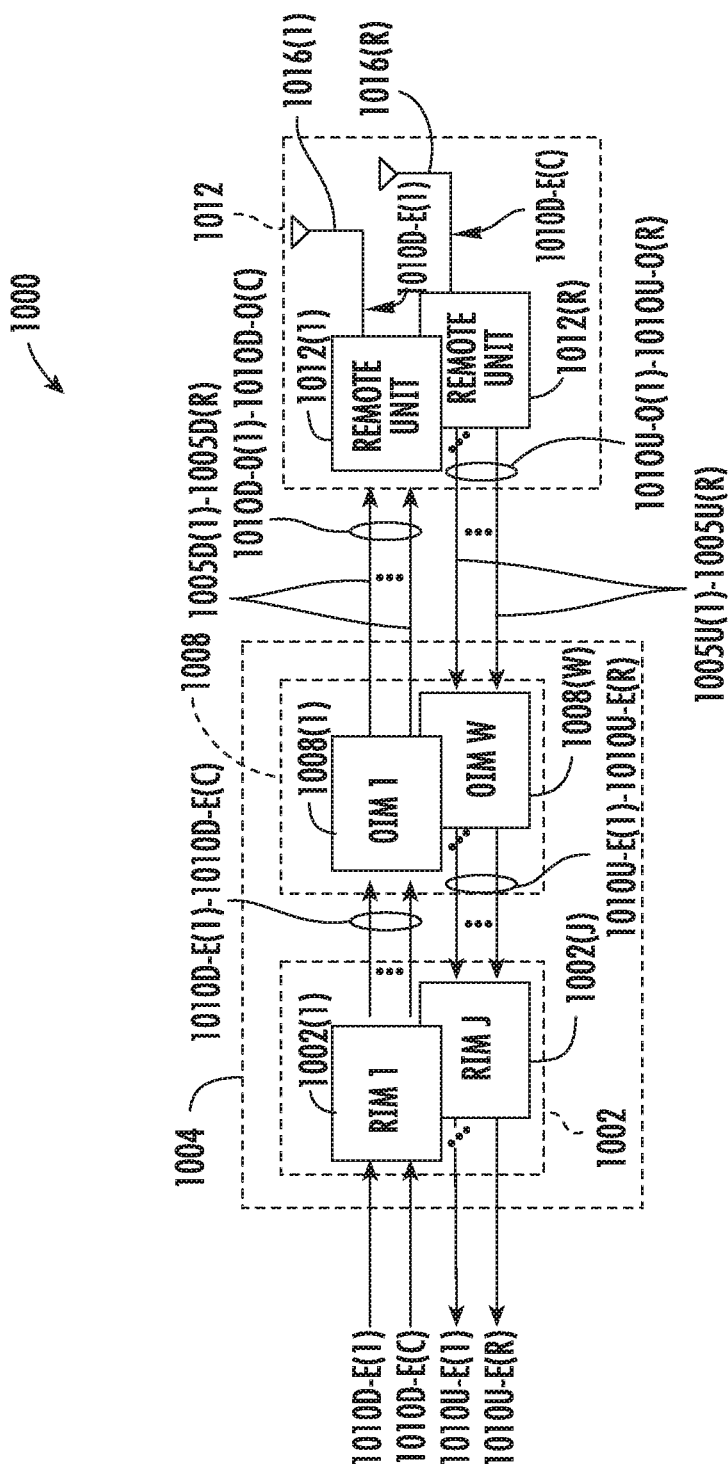
FIG. 10 is a schematic diagram of an exemplary optical fiber-based head-end unit coupled to a plurality of remote units.

The distributed communication system 504 of FIGS. 5A and 6 can be provided in a distributed communication system that is optical fiber based. For further information about such systems, FIGS. 10-13 are provided with the understanding that many different distributed communication systems may use the processes of the present disclosure. In this regard, FIG. 10 is a schematic diagram of an exemplary distributed communication system 1000 implemented in this example as an optical fiber-based distributed communication system 1000. The optical fiber-based distributed communication system 1000 is comprised of three (3) main components. One or more radio interfaces provided in the form of radio interface modules (RIMs) 1002(1)-1002(J) are provided in a central unit 1004 (e.g., the central unit 506 of FIGS. 5A and 6) to receive and process downlink RF communication signals 1010D-E(1)-1010D-E(C) prior to optical conversion into optical downlink communication signals. The RIMs 1002(1)-1002(J) provide both downlink and uplink interfaces for signal processing. The notations "1-J" and "1-C" indicate that any number of the referenced component, 1-J and 1-C, respectively, may be provided.

With continuing reference to FIG. 10, the central unit 1004 is configured to accept the plurality of RIMs 1002(1)-1002(J) as modular components that can easily be installed and removed or replaced in the central unit 1004. In one embodiment, the central unit 1004 is configured to support up to twelve (12) RIMs 1002(1)-1002(12). Each RIM 1002(1)-1002(J) can be designed to support a particular type of radio source or range of radio sources (i.e., frequencies) to provide flexibility in configuring the central unit 1004 and the optical fiber-based distributed communication system 1000 to support the desired radio sources. For example, one RIM 1002 may be configured to support the Personal Communication Services (PCS) radio band. Another RIM 1002 may be configured to support the 700 MHz radio band. In this example, by inclusion of these RIMs 1002, the central unit 1004 could be configured to support and distribute communication signals, including those for the communication services and communication bands described above as examples.

The RIMs 1002(1)-1002(J) may be provided in the central unit 1004 that support any frequencies desired, including but not limited to the ITS band of 5.9 GHz (5.85-5.925 GHz), licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 10, the downlink communication signals 1010D-E(1)-1010D-E(C) may be provided as downlink RF spectrum chunks to a plurality of optical interfaces provided in the form of optical interface modules (OIMs) 1008(1)-1008(W) in this embodiment to convert the unlicensed and/or licensed downlink RF communication signals 1010D-E(1)-1010D-E(C) into optical downlink communication signals 1010D-O(1)-1010D-O(C). The OIMs 1008(1)-1008(W) may be configured to provide one or more optical interface components (OICs) that contain optical-to-electrical (O-E) and electrical-to-optical (E-O) converters, as will be described in more detail below. The OIMs 1008(1)-1008(W) support the radio bands that can be provided by the RIMs 1002(1)-1002(J), including the examples previously described above.

The OIMs 1008(1)-908(W) each include E-O converters to convert the downlink RF communication signals 1010D-E(1)-1010D-E(C) into the optical downlink communication signals 1010D-O(1)-1010D-O(C). The optical downlink communication signals 1010D-O(1)-1010D-O(C) are communicated over a plurality of downlink optical fiber communication mediums 1005D(1)-1005D(R) to a plurality of RUs 1012(1)-1012(R). In a non-limiting example, at least one of the RUs 1012(1)-1012(R) is functionally equivalent to the RUs 502(1)-502(6) of FIGS. 5A and 6. O-E converters provided in the RUs 1012(1)-1012(R) (e.g., in or coupled to interface hardware or a network interface circuit) convert the optical downlink communication signals 1010D-O(1)-1010D-O(C) back into the downlink RF communication signals 1010D-E(1)-1010D-E(C), which are provided to antennas 1016(1)-1016(R) in the RUs 1012(1)-1012(R) to user equipment (not shown) in the reception range of the antennas 1016(1)-1016(R).

E-O converters are also provided in the RUs 1012(1)-1012(R) to convert uplink RF communication signals 1010U-E(1)-1010U-E(R) received from user equipment through the antennas 1016(1)-1016(R) into optical uplink communication signals 1010U-O(1)-1010U-O(R). The RUs 1012(1)-1012(R) communicate optical uplink communication signals 1010U-O(1)-1010U-O(R) over a plurality of uplink optical fiber communication mediums 1005U(1)-1005U(R) to the OIMs 1008(1)-1008(W) in the central unit 1004. The OIMs 1008(1)-1008(W) include O-E converters that convert the received optical uplink communication signals 1010U-O(1)-1010U-O(R) into uplink RF communication signals 1010U-E(1)-1010U-E(R), which are processed by the RIMs 1002(1)-1002(J) and provided as uplink RF communication signals 1010U-E(1)-1010U-E(R).

Note that the downlink optical fiber communication mediums 1005D(1)-1005D(R) and uplink optical fiber communication mediums 1005U(1)-1005U(R) connected to each RU 1012(1)-1012(R) may be a common optical fiber communication medium, wherein for example, wave division multiplexing (WDM) may be employed to provide the optical downlink communication signals 1010D-O(1)-1010D-O(C) and the optical uplink communication signals 1010U-O(1)-1010U-O(R) on the same optical fiber communication medium.

Figure 11:
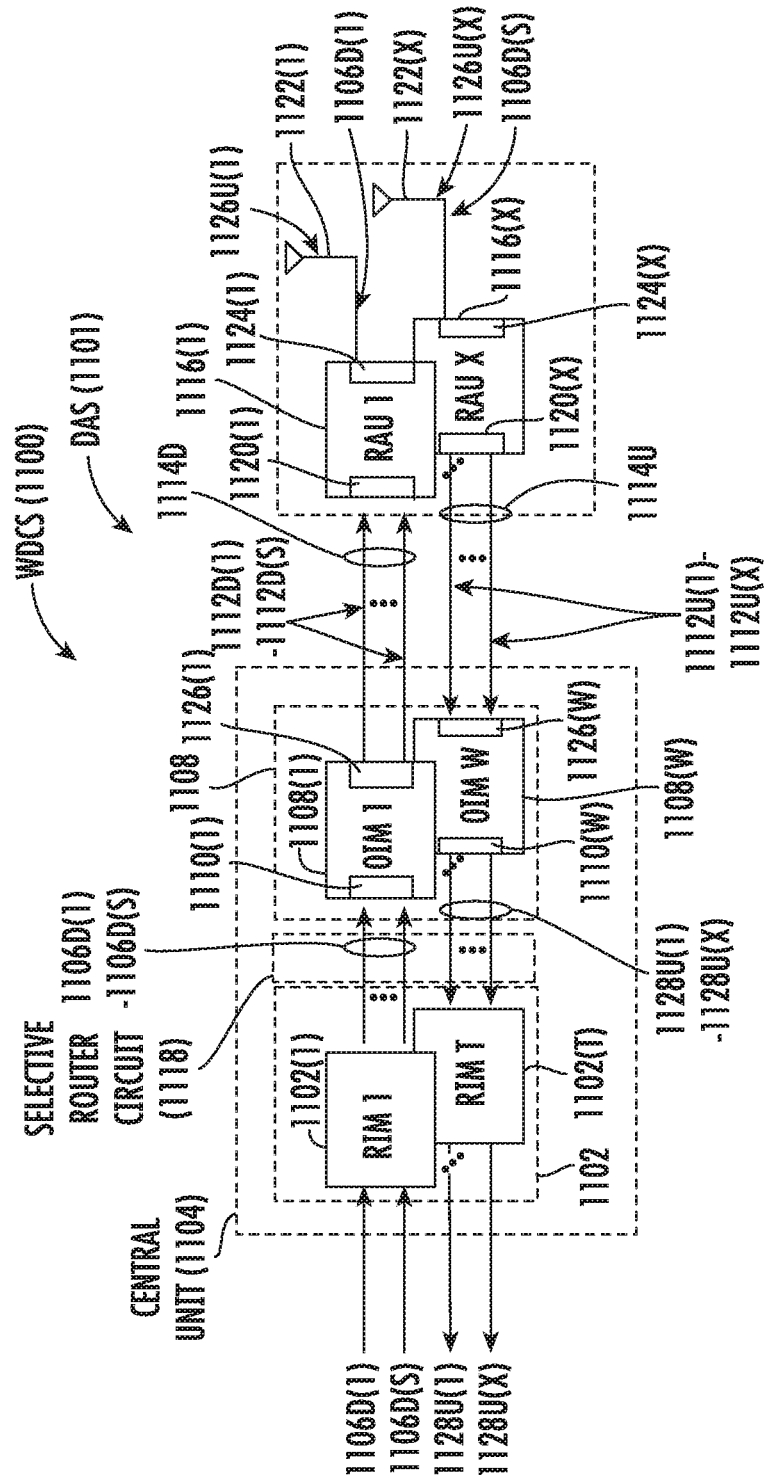
FIG. 11 is a schematic diagram of an exemplary non-contiguous WDCS provided in the form of an optical fiber-based DAS.

FIG. 11 is a schematic diagram of an exemplary non-contiguous wireless distributed communication system (WDCS) 1100 in the form of a non-contiguous DAS 1101. The DAS 1101 in this example is an optical fiber-based DAS. The non-contiguous DAS 1101 in this example is comprised of three (3) main components. One or more radio interfaces provided in the form of radio interface modules (RIMs) 1102(1)-1102(T) are provided in a central unit 1104 to receive and process downlink electrical communication signals 1106D(1)-1106D(S) prior to optical conversion into downlink optical communication signals. The downlink electrical communication signals 1106D(1)-1106D(S) may be received from a base station (not shown) as an example. The downlink electrical communication signals 1106D(1)-1106D(S) can each include one or more subcarrier sets of a cell radio, wherein each subcarrier set is comprised of one or more subcarriers (e.g., radio channels). The RIMs 1102(1)-1102(T) provide both downlink and uplink interfaces for signal processing. The notations "1-S" and "1-T" indicate that any number of the referenced component, 1-S and 1-T, respectively, may be provided.

With continuing reference to FIG. 11, the central unit 1104 is configured to accept the plurality of RIMs 1102(1)-1102(T) as modular components that can easily be installed and removed or replaced in the central unit 1104. In one embodiment, the central unit 1104 is configured to support up to twelve (12) RIMs 1102(1)-1102(12). Each RIM 1102(1)-1102(T) can be designed to support a particular type of radio source or range of radio sources (i.e., frequencies) to provide flexibility in configuring the central unit 1104 and the non-contiguous DAS 1101 to support the desired radio sources. For example, one RIM 1102 may be configured to support the Personal Communication Services (PCS) radio band. Another RIM 1102 may be configured to support the 700 MHz radio band. In this example, by inclusion of these RIMs 1102, the central unit 1104 could be configured to support and distribute communication signals, including those for the communication services and communication bands described above as examples.

The RIMs 1102(1)-1102(T) may be provided in the central unit 1104 that support any frequencies desired, including, but not limited to, licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 11, the downlink electrical communication signals 1106D(1)-1106D(S) may be distributed to a plurality of optical interfaces provided in the form of optical interface modules (OIMs) 1108(1)-1108(W) in this embodiment to convert the unlicensed and/or licensed downlink electrical communication signals 1106D(1)-1106D(S). The notation "1-W" indicates that any number of the referenced component 1-W may be provided. The OIMs 1108(1)-1108(W) may be configured to provide one or more optical interface components (OICs) that contain optical-to-electrical (O-E) and electrical-to-optical (E-O) converters, as will be described in more detail below. The OIMs 1108(1)-1108(W) support the radio bands that can be provided by the RIMs 1102(1)-1102(T), including the examples previously described above.

The OIMs 1108(1)-1108(W) each include E-O converters 1110(1)-1110(W) to convert the downlink electrical communication signals 1106D(1)-1106D(S) into downlink optical communication signals 1112D(1)-1112D(S). The downlink optical communication signals 1112D(1)-1112D(S) are communicated over downlink optical fiber communication medium 1114D to a plurality of remote units provided in the form of remote antenna units 1116(1)-1116(X). A selective router circuit 1118 can be provided to selectively block certain subcarrier sets and/or subcarriers in the downlink optical communication signals 1112D(1)-1112D(S) distributed to the respective remote antenna units 1116(1)-1116(X) based on subcarriers associated with the respective remote antenna units 1116(1)-1116(X). The remote antenna units 1116(1)-1116(X) are arranged non-contiguously to each other based on their supported cell radio. The notation "1-X" indicates that any number of the referenced component 1-X may be provided. O-E converters 1120(1)-1120(X) provided in the remote antenna units 1116(1)-1116(X) convert the downlink optical communication signals 1112D(1)-1112D(S) back into the downlink electrical communication signals 1106D(1)-1106D(S), which are provided to antennas 1122(1)-1122(X) in the remote antenna units 1116(1)-1116(X) to user equipment (not shown) in the reception range of the antennas 1122(1)-1122(X).

E-O converters 1124(1)-1124(X) are also provided in the remote antenna units 1116(1)-1116(X) to convert uplink electrical communication signals 1126U(1)-1126U(X) received from user equipment (not shown) through the antennas 1122(1)-1122(X) into uplink optical communication signals 1112U(1)-1112U(X). The remote antenna units 1116(1)-1116(X) communicate the uplink optical communication signals 1112U(1)-1112U(X) over an uplink optical fiber communication medium 1114U to the OIMs 1108(1)-1108(W) in the central unit 1104. The OIMs 1108(1)-1108(W) include O-E converters 1126(1)-1126(W) that convert the received uplink optical communication signals 1112U(1)-1112U(X) into uplink electrical communication signals 1128U(1)-1128U(X), which are processed by the RIMs 1102(1)-1102(T) and provided as uplink electrical communication signals 1128U(1)-1128U(X). The central unit 1104 may provide the uplink electrical communication signals 1128U(1)-1128U(X) to a source transceiver, such as a cell radio provided as base station or other communication system. The selective router circuit 1118 may be configured to selectively block certain subcarrier sets and/or subcarriers in the uplink electrical communication signals 1128U(1)-1128U(X) distributed to the respective remote antenna units 1116(1)-1116(X) based on subcarriers associated with the respective remote antenna units 1116(1)-1116(X). Note that the downlink optical fiber communication medium 1414D and uplink optical fiber communication medium 1414U connected to each remote antenna unit 1116(1)-1116(X) may be a common optical fiber communication medium, wherein for example, wave division multiplexing (WDM) may be employed to provide the downlink optical communication signals 1112D(1)-1112D(S) and the uplink optical communication signals 1112U(1)-1112U(X) on the same optical fiber communications medium.

Figure 12:
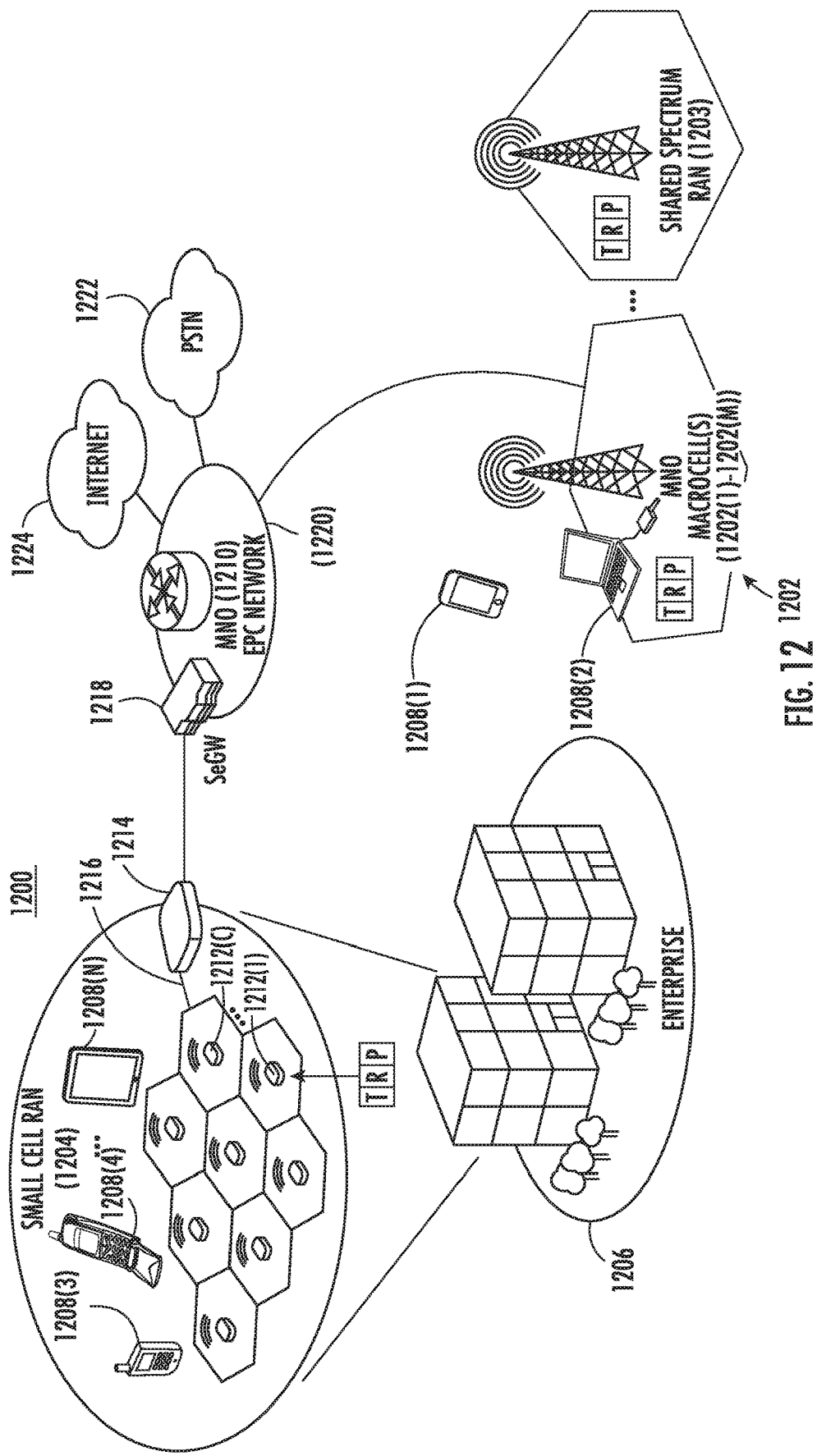
FIG. 12 is an exemplary mobile telecommunication environment that includes an exemplary microcell radio access network (RAN) and an exemplary small cell RAN, some or all of which may be included in the distributed communication system of the present disclosure.

FIG. 12 is a schematic diagram of an exemplary mobile telecommunication environment 1200 (also referred to as "environment 1200") that includes exemplary macrocell radio access networks (RANs) 1202(1)-102(M) ("macrocells 1202(1)-1202(M)"), a shared spectrum RAN 1203, and an exemplary small cell RAN 1204 located within an enterprise environment 1206. The shared spectrum RAN 1203 (also referred to as "shared spectrum cell 1203") includes a macrocell in this example and supports communication on frequencies that are not solely licensed to a particular mobile network operator (MNO) and thus may service user equipment (UE) 1208(1)-1208(N), which are communication devices, independent of a particular MNO. The UEs 1208(1)-1208(N) may be mobile UEs (e.g., cellular phones or mobile devices) that can communicate wirelessly. For example, the shared spectrum cell 1203 may be operated by a third party that is not an MNO and wherein the shared spectrum cell 1203 supports citizens broadband radio service (CBRS) or unlicensed spectrum. The mobile telecommunication environment 100 is configured to service mobile communication between a UE 1208(1)-1208(N) to a MNO 1210. When a macrocell 1202(1)-1202(M), shared spectrum RAN 1203, or small cell RAN 1204 services communication with a UE 1208(1)-1208(N), such macrocell 1202(1)-1202(M), shared spectrum RAN 1203, or small cell RAN 1204 is considered a "source RAN." A source RAN for a UE 1208(1)-1208(N) is a RAN or cell in the RAN in which the UEs 1208(1)-1208(N) have an established communication session with the exchange of mobile communication signals for mobile communication. Thus, a serving RAN may also be referred to herein as a serving cell. For example, the UEs 1208(3)-1208(N) in FIG. 12 are being serviced by the small cell RAN 1204, whereas UEs 1208(1), 1208(2) are being serviced by the macrocells 1202(1)-1202(M). The macrocells 1202(1)-1202(M) are MNO macrocells in this example. In this example, each of the macrocells 1202(1)-1202(M), shared spectrum RAN 1203, and small cell RAN 1204 include a transmitter circuit T configured to transmit a communication signal to a UE 1208(1)-1208(N) and a receiver circuit R configured to receive communication signals from the UE 1208(1)-1208(N). Each of the macrocells 1202(1)-1202(M), shared spectrum RAN 1203, and small cell RAN 1204 also include a processor circuit P (e.g., a microprocessor, micro-controller, other control circuit) communicatively coupled to the transmitter circuit T and the receiver circuit R for processing communication signals and performing other processing for signaling.

With continuing reference to FIG. 12, the mobile telecommunication environment 1200 in this example is arranged as a Long Term Evolution (LTE) system as described by the Third Generation Partnership Project (3GPP) as an evolution of the standards Global System for Mobile communication/Universal Mobile Telecommunications System (GSM/UMTS). It is emphasized, however, that the aspects described herein may also be applicable to other network types and protocols. The mobile telecommunication environment 1200 includes the enterprise environment 1206 in which the small cell RAN 1204 is implemented. The small cell RAN 1204 includes a plurality of small cell radio nodes 1212(1)-1212(C). Each small cell radio node 1212(1)-1212(C) has a radio coverage area (graphically depicted in the drawings as a hexagonal shape) that is commonly termed a "small cell." A small cell may also be referred to as a femtocell, or using terminology defined by 3GPP as a Home Evolved Node B (HeNB). In the description that follows, the term "cell" typically means the combination of a radio node and its radio coverage area unless otherwise indicated.

The size of the enterprise environment 1206 and the number of cells deployed in the small cell RAN 1204 may vary. In typical implementations, the enterprise environment 1206 can be from 50,000 to 500,000 square feet and encompass multiple floors, and the small cell RAN 1204 may support hundreds to thousands of users using mobile communication platforms such as mobile phones, smartphones, tablet computing devices, and the like shown as the UEs 1208(3)-1208(N). However, the foregoing is intended to be illustrative and the solutions described herein can be typically expected to be readily scalable either upwards or downwards as the needs of a particular usage scenario demand.

In FIG. 12, the small cell RAN 1204 includes one or more services nodes (represented as a single services node 1214 in FIG. 12) that manage and control the small cell radio nodes 1212(1)-1212(C). In alternative implementations, the management and control functionality may be incorporated into a radio node, distributed among nodes, or implemented remotely (i.e., using infrastructure external to the small cell RAN 1204). The small cell radio nodes 1212(1)-1212(C) are coupled to the services node 1214 over a direct or LAN connection 1216, as an example, typically using secure IPsec tunnels. The services node 1214 aggregates voice and data traffic from the small cell radio nodes 1212(1)-1212(C) and provides connectivity over an IPsec tunnel to a security gateway (SeGW) 1218 in an Evolved Packet Core (EPC) network 1220 of the MNO 1210. The EPC network 1220 is typically configured to communicate with a public switched telephone network (PSTN) 1222 to carry circuit-switched traffic, as well as for communicating with an external packet-switched network such as the Internet 1224.

The environment 1200 also generally includes an Evolved Node B (eNB) base station, or "macrocell" 1202. The radio coverage area of the macrocell 1202(1)-1202(M) is typically much larger than that of a small cell where the extent of coverage often depends on the base station configuration and surrounding geography. Thus, a given UE 1208(3)-1208(N) may achieve connectivity to the EPC network 1220 through either a macrocell 1202 or small cell radio node 1212(1)- 1212(C) in the small cell RAN 1204 in the environment 1200.

A general principle in environment 1200 in FIG. 12 is that a serving RAN (e.g., an eNB in such system) provides a measurement configuration to the UEs 1208(1)-1208(N) to "point" the receiver of the UEs 1208(1)-1208(N) to find other systems (e.g., neighboring cells) transmitting at a specified frequency(ies) (e.g., at 1900 MHz, 2500 MHz) according to the measurement configuration that the UE 1208(1)-1208(N) should measure. The measurement of communication signals of other RANs by the UE 1208(1)- 1208(N) at specified frequencies is performed for a variety of purposes, including inter-frequency mobility and inter-frequency measurements. The UE 1208(1)-1208(N) can find these communication systems and perform actions, such as cell selection in the idle mode and sending of measurement reports (e.g., Measurement Report Messages (MRMs)) in the active mode. These measurement reports can be used by the serving RAN (e.g., MNO macrocells 1202(1)-1202(M), shared spectrum cell 1203, small cell RAN 1204) to, for example, trigger handovers or to gather information about neighboring cells through Automatic Neighbor Relation (ANR) discovery. For example, the MNO macrocells 1202 (1)-1202(M) may use the MRMs for cell reselection to cause a UE 1208(1)-1208(N) to be serviced by a different cell controlled by the MNO, such as the small cell RAN 1204 for example, for optimizing communication. This measurement report information is delivered in user mobile communication device-specific radio resource control signaling messages to serviced UEs 1208(1)-1208(N) that indicate to the UE 1208(1)-1208(N) the appropriate measurement configuration parameters. In these measurement configuration parameters, there are specific instructions about what frequencies the serviced UE 1208(1)-1208(N) should measure. The information measured by the UEs 1208(1)-1208(N) is then reported back to the serving RAN.

With reference back to FIG. 12, the MNO macrocells 1202(1)-1202(M), the shared spectrum cell 1203, and the small cell RAN 1204 may be neighboring radio access systems to each other, meaning that some or all can be in proximity to each other such that a UE 1208(3)-1208(N) may be able to be in communication range of two or more of the MNO macrocells 1202(1)-1202(M), the shared spectrum cell 1203, and the small cell RAN 1204 depending on the location of UE 1208(3)-1208(N). If a UE 1208(1)-1208 (N) serviced by the small cell RAN 1204 as a source RAN moves into the communication coverage area of a neighboring macrocell 1202(1)-1202(M), the source RAN, detecting a weaker communication signal from the UE 1208(1)- 1208(N), initiates a handover command (i.e., request) to the neighboring macrocell 1202(1)-1202(M) as a "target RAN." The small cell RAN 1204 may be aware of the EARFCN of the MNO macrocells 1202(1)-1202(M) as part of its configuration or an ANR discovery process discussed above. Similarly, if a UE 1208(1)-1208(N) serviced by the shared spectrum cell 1203 as a source RAN moves into the communication coverage area of a neighboring macrocell 1202 (1)-1202(M), the source RAN initiates a handover command (i.e., request) to the neighboring macrocell 1202(1)-1202 (M) as a "target RAN." The target RAN has a target coverage area overlapping a source coverage area of the source RAN in this example. The shared spectrum cell 1203 may be aware of the EARFCN of the MNO macrocells 1202(1)-1202(M) as part of its configuration or an ANR process discussed above.

Figure 13:
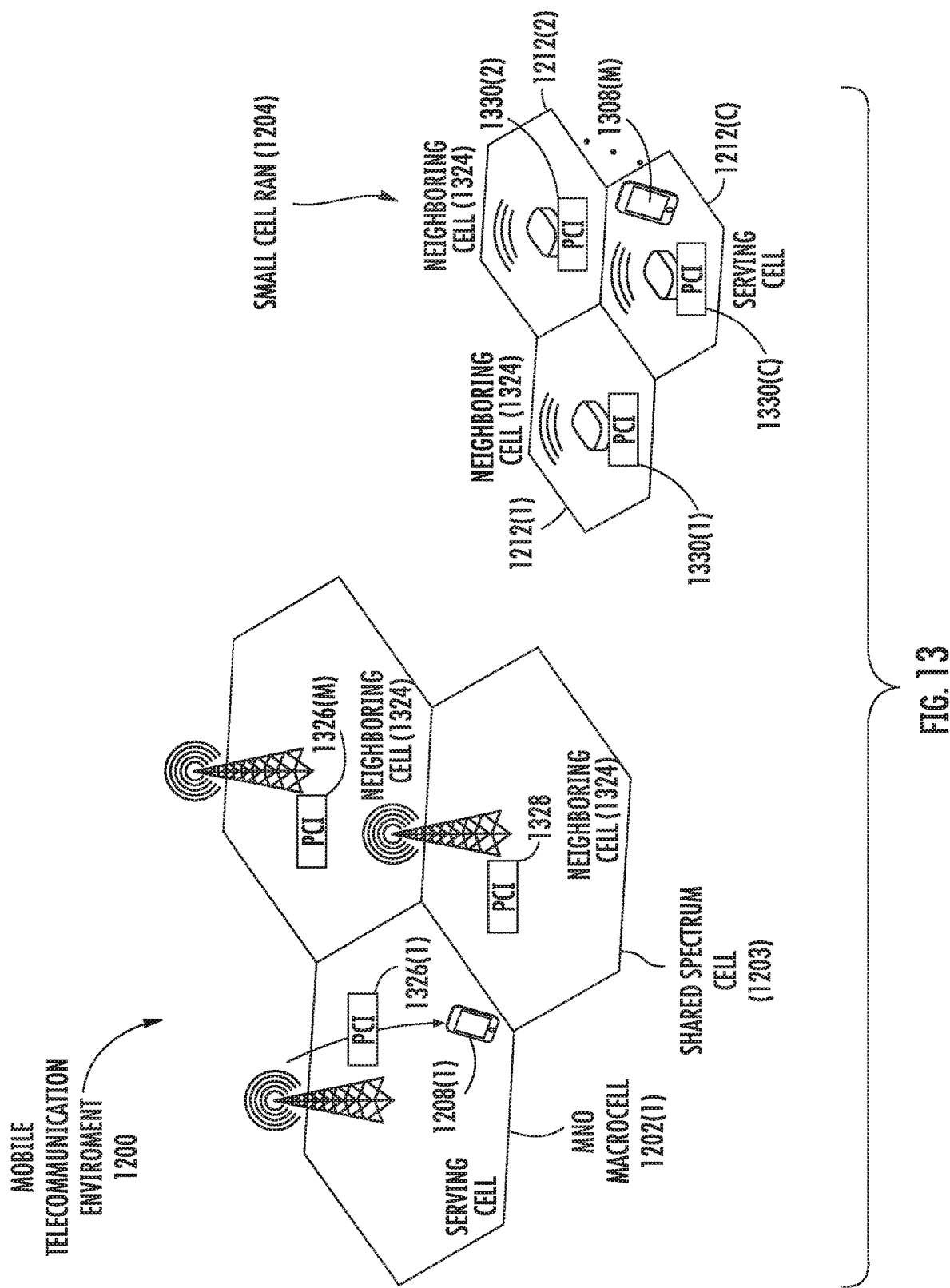
FIG. 13 illustrates small cells and neighboring macro cells within the mobile telecommunication environment in FIG. 12.

A UE 1208 connected to the environment 1200 will actively or passively monitor a cell in a macrocell 1202(1)- 1202(M) in an access network in the communication range of the UE 1208 as the UE 1208 moves throughout the environment 1200. As shown in FIG. 13, such a cell is termed the "serving cell." For example, if a UE 1208 is in communication through an established communication session with a particular small cell radio node 1212(1)-1212(C) in the small cell RAN 1204, the particular small cell radio node 1212(1)-1212(C) will be the serving cell to the UE 1208, and the small cell RAN 1204 will be the serving RAN. The UE 1208 will continually evaluate the quality of a serving cell as compared with that of a neighboring cell 1324 in the small cell RAN 1204, MNO macrocells 1202, and/or the shared spectrum cell 1203, as shown in FIG. 13. A neighboring cell 1324 is a cell among the small cell RAN 1204, MNO macrocells 1202, and/or the shared spectrum cell 1203 that is not in control of the active communication session for a given UE 1208, but is located in proximity to a serving cell to a UE 1208 such that the UE 1208 could be in communication range of both its serving cell and the neighboring cell 1324. Each of the small cell radio nodes 1212(1)-1212(C), the macrocells 1202(1)-1202(M), and the shared spectrum cell 1203 can identify themselves to a UE 1208 using a respective unique Physical Cell Identity (PCI) 1326(1)-1326(M), 1328, 1330(1)-1330(C) (e.g., a public land mobile network (PLMN) identification (ID) (PLMN ID)) that is transmitted over a downlink UE 1208. Each of the small cell radio nodes 1212(1)-1212(C), the MNO macrocells 1202(1)-1202(M), and the shared spectrum cell 1203 can assign a physical channel identity (PCI) that allows the UE 1208 to distinguish adjacent cells. As such, the PCIs 1326(1)-326(M), 1328, 1330(1)-1330(C) are uniquely assigned among neighboring cells 1324, but can be reused across geographically separated cells.

Figure 14:
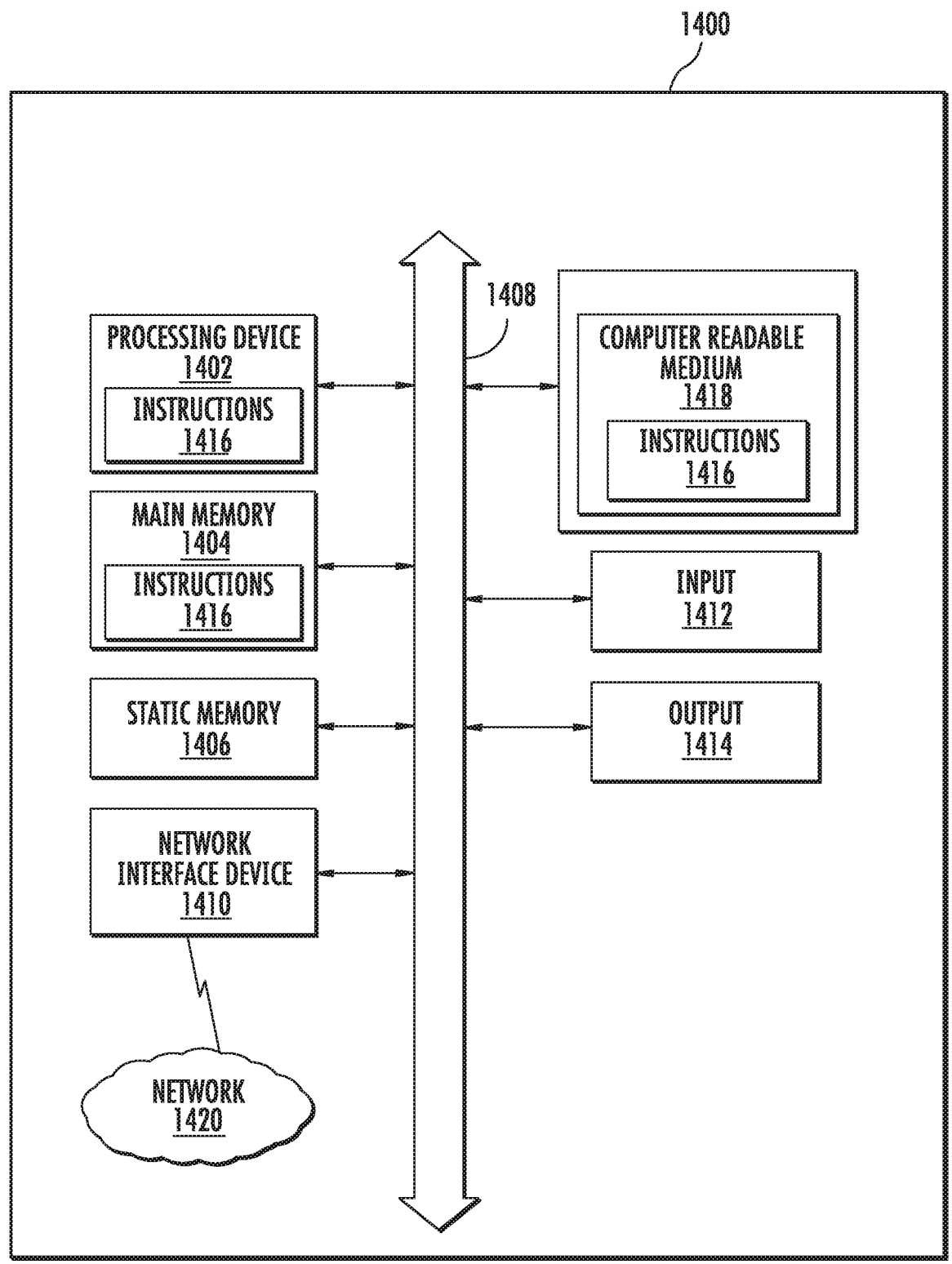
FIG. 14 is a schematic diagram of a generalized representation of an exemplary computer system that can be used for controlling the power distribution modules disclosed herein, wherein the exemplary computer system is adapted to execute instructions from an exemplary computer-readable media.

FIG. 14 is a schematic diagram representation of additional detail regarding an exemplary computer system 1400. The exemplary computer system 1400 in this embodiment includes a processing device or processor 1402, a main memory 1404 (e.g., read-only memory (ROM), flash memory, dynamic random access memory (DRAM) such as synchronous DRAM (SDRAM), etc.), and a static memory 1406 (e.g., flash memory, static random access memory (SRAM), etc.), which may communicate with each other via the data bus 1408. Alternatively, the processing device 1402 may be connected to the main memory 1404 and/or static memory 1406 directly or via some other connectivity means. The processing device 1402 may be a controller, and the main memory 1404 or static memory 1406 may be any type of memory.

The processing device 1402 represents one or more general-purpose processing devices such as a microprocessor, central processing unit, or the like. More particularly, the processing device 1402 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1402 is configured to execute processing logic in instructions 1416 for performing the operations and steps discussed herein.

The computer system 1400 may further include a network interface device 1410. The computer system 1400 also may or may not include an input 1412 to receive input and selections to be communicated to the computer system 1400 when executing instructions. The computer system 1400 also may or may not include an output 1414, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1400 may or may not include a data storage device that includes instructions 1416 stored in a computer-readable medium 1418. The instructions 1416 may also reside, completely or at least partially, within the main memory 1404 and/or within the processing device 1402 during execution thereof by the computer system 1400, the main memory 1404 and the processing device 1402 also constituting computer-readable medium 1418. The instructions 1416 may further be transmitted or received over a network 1420 via a network interface device 1410.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for mapping locations of remote units in a distributed communication system, the method comprising:
   detecting an application mobile unit with at least one of a plurality of remote units in the distributed communication system;
   determining which of the plurality of remote units is closest to the application mobile unit;
   receiving at a central unit a location identifier from the application mobile unit; and
   mapping the location identifier to a respective output port in the central unit, wherein
   determining which of the plurality of remote units is closest to the application mobile unit comprises connecting all output ports of the central unit to a single cell input port.

2. The method of claim 1, further comprising receiving, at the central unit, respective remote unit identifiers from each of the plurality of remote units.

3. The method of claim 2, further comprising mapping the respective remote unit identifiers to respective output ports in the central unit.

4. The method of claim 1, wherein mapping the location identifier comprises storing the location identifier and the respective output port in a look-up table.

5. The method of claim 1, wherein determining which of the plurality of remote units is closest to the application mobile unit further comprises turning off individual output ports of the central unit and checking for received power level changes.

6. The method of claim 5, wherein checking for the received power level changes further comprises detecting a drop in received power when a port associated with the remote unit closest to the application mobile unit is turned off.

7. The method of claim 1, further comprising installing the plurality of remote units in the distributed communication system.

8. The method of claim 1, further comprising connecting fiber from each of the plurality of remote units to the central unit in the distributed communication system.

9. The method of claim 1, further comprising making clusters from a subset of the plurality of remote units.

10. The method of claim 1, wherein determining which of the plurality of remote units is closest to the application mobile unit further comprises changing an uplink gain for one output port.

11. The method of claim 10, wherein determining which of the plurality of remote units is closest to the application mobile unit further comprises detecting a change in a received signal from the one output port.

12. The method of claim 1, wherein determining which of the plurality of remote units is closest to the application mobile unit further comprises selectively coupling a second cell to one output port.

13. The method of claim 12, wherein determining which of the plurality of remote units is closest to the application mobile unit further comprises causing a remote unit associated with the one output port to transmit a remote unit identifier to the application mobile unit.

14. The method of claim 13, wherein determining which of the plurality of remote units is closest to the application mobile unit further comprises receiving from the application mobile unit a report indicating a highest received signal strength and a remote unit identifier.

15. The method of claim 1, further comprising repeating the determining for multiple ones of the plurality of remote units.

16. A method for mapping locations of remote units in a distributed communication system, the method comprising:
   detecting an application mobile unit with at least one of a plurality of remote units in the distributed communication system;
   determining which of the plurality of remote units is closest to the application mobile unit;
   receiving at a central unit a location identifier from the application mobile unit;
   mapping the location identifier to a respective output port in the central unit; and
   repeating the determining for multiple cells coupled to input ports of the central unit.

* * * * *